United States Patent [19]

Yada et al.

[11] Patent Number: 5,492,387
[45] Date of Patent: Feb. 20, 1996

[54] AUTOMOBILE WINDSHIELD MOLDING

[75] Inventors: Yukihiko Yada, Nagoya; Toshio Hirose, Handa, both of Japan

[73] Assignee: Tokai Kogyo Kabushiki Kaisha, Ohbu, Japan

[21] Appl. No.: 219,421

[22] Filed: Mar. 29, 1994

Related U.S. Application Data

[63] Continuation of Ser. No. 850,831, Mar. 13, 1992, abandoned.

[30] Foreign Application Priority Data

| Mar. 15, 1991 | [JP] | Japan | 3-076858 |
| Apr. 30, 1991 | [JP] | Japan | 3-126895 |
| Jan. 10, 1992 | [JP] | Japan | 4-022079 |

[51] Int. Cl.⁶ .................................. B60J 10/02
[52] U.S. Cl. .......................... 296/93; 52/204.597
[58] Field of Search ............... 296/146.15, 93, 296/146 M, 208, 213; 52/208, 400, 204.591, 204.597

[56] References Cited

U.S. PATENT DOCUMENTS

| 4,884,380 | 12/1989 | Yada et al. | 296/93 X |
| 5,009,460 | 4/1991 | Iwata et al. | 296/93 |
| 5,114,206 | 5/1992 | Yada | 52/208 X |
| 5,139,302 | 8/1992 | Kanke | 296/93 |
| 5,193,876 | 3/1993 | Yada et al. | 296/93 |

FOREIGN PATENT DOCUMENTS

| 62-231814 | 10/1987 | Japan. |
| 62-283017 | 12/1987 | Japan. |
| 62-289427 | 12/1987 | Japan. |
| 63-291721 | 11/1988 | Japan. |
| 1-195032 | 8/1989 | Japan. |
| 1-244820 | 9/1989 | Japan. |
| 1-269611 | 10/1989 | Japan. |
| 1-269613 | 10/1989 | Japan. |
| 1-269612 | 10/1989 | Japan. |
| 86621 | 4/1991 | Japan | 296/93 |

*Primary Examiner*—Andrew C. Pike
*Attorney, Agent, or Firm*—Oblon, Spivak, McClelland, Maier & Neustadt

[57] ABSTRACT

An automobile windshield molding is installed together with a metallic core material against a windshield installed in a window opening section of an automobile body panel. The windshield molding having a decorative section for covering an outside portion of the vehicle body panel and an installation section projecting from a rear side of the decorative section. The molding also includes a metallic core material which acts as a supporting frame for the molding. The metallic core material is disposed from the decorative section to the installation section.

9 Claims, 30 Drawing Sheets

AUTOMOBILE WINDSHIELD MOLDING

This application is a Continuation of application Ser. No. 07/850,831, filed on Mar. 13, 1992, now abandoned.

BACKGROUND OF THE INVENTION

1. Field of the Invention

The present invention relates to a long size automobile windshield molding to be installed together with a metallic core material against a windshield installed in an automobile body panel window opening section.

2. Description of the Prior Art

Generally, around a peripheral edge of a windshield installed in an automobile body panel window opening section or a roof panel side edge, a windshield molding serving both as a sealant and a decorative material is installed. For example, between a windshield periphery and an opening edge of a vehicle body panel window opening section, a long and narrow space is formed consecutively, and both a seal and a decoration for said space are performed by embedding a long size lacy body in this long and narrow space. Further, in a long and narrow space formed from a windshield side section to a roof panel, a long size lacy body is frequently embedded.

Though an automobile molding installed consecutively in such different vehicle body sections is also equipped with both a decorative section for covering beltlike an outside surface of a vehicle body panel similarly to other moldings and an installation section embedded and fixed by projecting from this decorative section toward an interior side of the vehicle body panel, among them, the ones fixing a metallic core material constituting a molding supporting frame to a vehicle body panel side with bolts or clips are exemplified in Japanese Patent Laid-Open Publication No. 137213/1984, Japanese Utility Model Registration Laid-Open Publication No. 2810/1986, Japanese Patent Laid-Open Publication No. 289427/1987 or U.S. Pat. No. 50099460.

With regard to a molding having a metallic core material, a vehicle windshield outside surface is pressed closely against a vehicle body panel side with the metallic core material, and the windshield is fixed to a predetermined regulated height position. Owing to this, a water leakage preventive function for the windshield can be improved.

Though an automobile molding is usually molded in a long size form by an extrusion molding, especially in case of producing a molding installed in different vehicle body sections, a method that after molding separately each of plural lacy fragments having a form corresponding to each vehicle body panel section by an extrusion molding in the first place, each of those lacy fragments is connected in a long size form with joint members is generally adopted. However, a molding having a structure of connecting these plural lacy fragments presents problems with its decoration or sealing function.

From this point of view, a windshield molding is formerly proposed, for example, in Japanese Patent Laid-Open Publication No. 291721/1988 or Japanese Patent Laid-Open Publication No. 244820/1989, by which after an overall length of a certain basic form molding is molded in succession by an extrusion molding the first place, then unnecessary parts are removed by cutting a part of its molding so as to have different cross sectional forms along their lengthwise directions.

However, with regard to such conventional molding, a molding form is limited only to a form capable of molding by cutting and the molding quality also has its limit. Further, a molding to transform a cross sectional structure of no cutting sections can not be allowed. For example, a molding transforming a cross section of an installation section embedded in a vehicle body panel side in the lengthwise direction while keeping uniformly a cross sectional form of a decorative section extending beltlike on the vehicle body panel outside surface through its overall length, or a molding transforming separately the decorative section and the installation section, cannot be molded by said cutting process.

With regard to a molding having said metallic core materials, generally, the metallic core materials are arranged through its overall length so that a transformation into an optional form capable of saving space becomes impossible. Furthermore, in case of bending long size metallic core materials, a large size machine and mold are required.

With regard to a windshield molding exemplified in Japanese Utility Model Laid-Open No. 158908/1985 and U.S. Pat. No. 3851432 or U.S. Pat. No. 4165119, the installation section is embedded in adhesives or connected closely to the windshield. In these cases, in addition to making a successful fit into a part which should be installed curvedly, both storage conditions and transportability can be made excellent, but there arises a problem that a position regulating active force which has a windshield held at a predetermined height cannot be obtained satisfactorily as those exemplified in each Publication.

Furthermore, in Japanese Patent Laid-Open Publication No. 231814/1987, the one transforming a molding seemingly by adding other parts is proposed. According to this means, a form incapable of molding by a cutting process can be molded, but there are also problems that its molding form has some limit and at the same time both a production process and an assembling process for adding parts are increased to cause a poor productivity. Furthermore, one the one hand, as exemplified in Japanese Utility Model Laid-Open No. 145414/1984, Japanese Patent Laid-Open Publication No. 231814/1987, Japanese Patent Laid-Open Publication No. 291721/1988, Japanese Patent Laid-Open Publication No. 195032/1989, Japanese Patent Laid-Open Publication No. 244820/1989, Japanese Patent Laid-Open Publication No. 269611/1989, Japanese Patent Laid-Open Publication No. 269612/1989, Japanese Patent Laid-Open Publication No. 269613/1989 and Japanese Utility Model Laid-Open No. 128411/1989, a molding having a rainwater drain channel is generally known. This rainwater drain channel is arranged to guide rainwater sticking on to a windshield to a desirable section to drain out. In case of arranging a rainwater drain channel like this, a concave drain channel is usually formed in the molding decorative section along the windshield periphery.

With regard to a windshield molding constituted from an elastic body forming the whole of a decorative section having a rainwater drain channel, transformations are apt to be caused to a concave drain channel especially under a high temperature environment, and there will be a high possibility of injuring the rainwater guiding function and the external appearance by, for example, touching it with someone's fingers. In Japanese Patent Laid-Open Publication No. 283017/1987, a windshield molding embedding core materials in a decorative section is disclosed, and the decorative section having a rainwater drain channel is reinforced. However, even in this type, core materials are arranged through an overall length of a molding so that the same problems with respect to custody space and the large size of forming machines are raised.

Furthermore, in Japanese Utility Model Laid-Open No. 125208/1989 and Japanese Utility Model Laid-Open Publication No. 125209/1989, the same problems still remain.

SUMMARY OF THE INVENTION

Accordingly, an object of the present invention is to provide an automobile windshield molding being molded such that the molding can have a satisfactory position regulating force which has a windshield held at a predetermined height while giving a certain intensity to a decorative section having a rainwater drain channel in addition to having an excellent installation responsiveness to sections for installing different objects and furthermore can have an excellent decorativeness, storage condition and transportability and can be molded both consecutively and efficiently.

To attain this object, the decorative section in the present invention is constituted such that a vehicle body outside surface form at a cross section in the direction crossing at right angles to the lengthwise direction consists of a long size form continuum, and at the same time the installation section is constituted such that a section corresponding to a side edge of a windshield and other sections are molded in a mutually different cross sectional form and furthermore the metallic core materials are not arranged in said other sections but arranged only in a section corresponding to a side edge of the windshield.

DETAILED DESCRIPTION OF THE PREFERRED EMBODIMENTS

An embodiment of the present invention will be explained in detail hereinafter according to the drawings.

Figure 5:
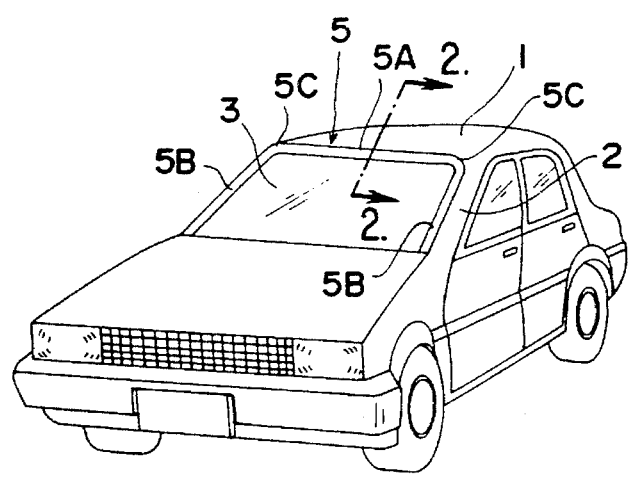
FIG. 5 is a perspective view showing an external appearance on the automobile front side according to the present invention.

In a example of applying the present invention to an automobile front windshield molding, as shown in FIG. 5 in the first place, a front windshield 3 is stuck fast from a vehicle body outside to an inside peripheral section of a front window frame opening section formed by both a front edge of a roof panel 1 and a front edge of a pillar panel 2. Between a periphery of this front windshield and an inside peripheral section of a window frame opening section of vehicle body panels 1 and 2, a long and narrow space is formed consecutively so that a long size lacy body 5 is installed as if covering said long and narrow body.

Figure 4:
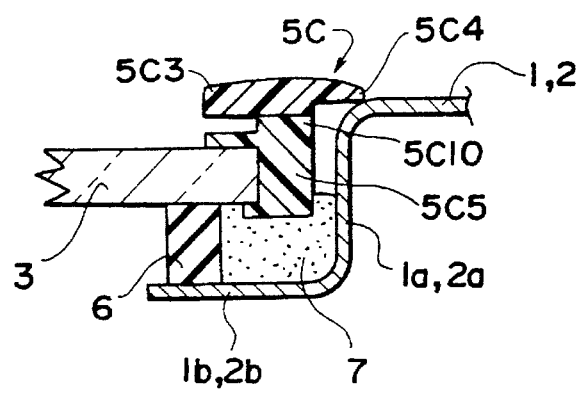
FIG. 4 is a cross sectional view taken along line 4—4 in FIG. 2.

The lacy body 5 has an upper lacy section 5A, a corner lacy section 5C and a side lacy section 5B, and is installed from an upper edge of the front windshield 3 through a corner edge in to both side edges with unillustrated fasteners. The first embodiment of such an automobile windshield molding is shown in FIG. 1 or FIG. 4.

Figure 1:
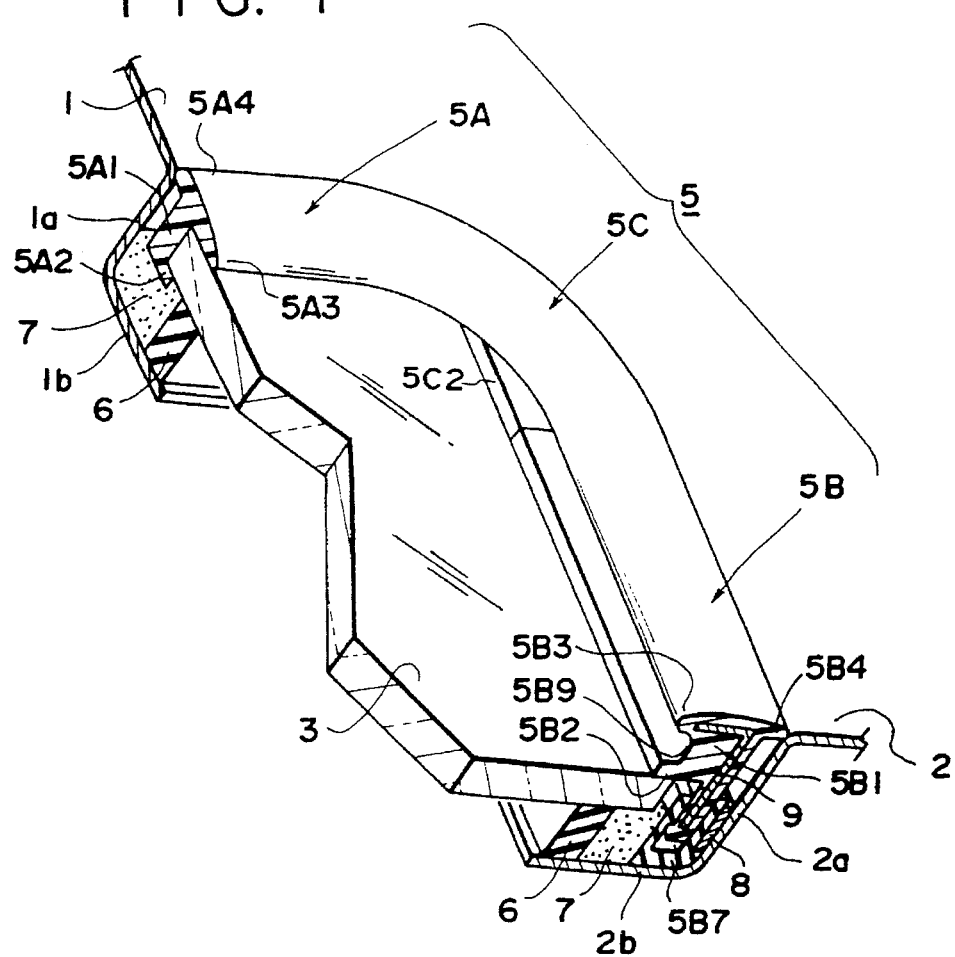
FIG. 1 is a fragmentarily enlarged perspective view showing a structure around a corner of an automobile windshield molding in the first embodiment of the present invention.
Figure 2:
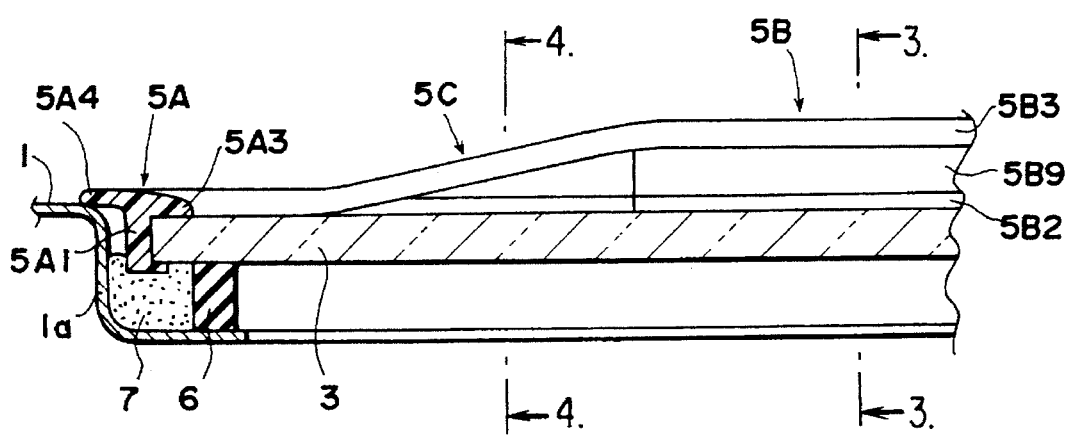
FIG. 2 is a cross sectional view taken along line 2—2 in FIG. 5 showing a structure of an automobile windshield molding in the first embodiment of the present invention.

In the first place, the upper lacy section 5A has both a form and a installation mechanism as shown in FIG. 1 and FIG. 2.

The front edge section of the roof panel 1 is bent in stairs form so as to have a height difference denting toward a vehicle body inside (the lower side of FIG. 2), and a flange section 1b is arranged through a vehicle body inside bending section 1a. On a vehicle body outside surface of this flange section 1b (the upper side of FIG. 2), said front windshield 3 is loaded to be a certain height through a dam rubber 6, and an upper edge of said front windshield 3 (the left edge of FIG. 2) is arranged so as to be opposed to the vehicle body inside bending section 1a at regular intervals. In spaces compartmented with the front windshield 3, vehicle body inside bending section 1a and flange section 1b, adhesives are filled up, and said each member of both 3 and 6 sides and 1a and 1b sides is stuck fast to each other with these adhesives.

Furthermore, into the space between said front windshield 3 and the vehicle body inside bending section 1a, a strut section 5A1 constituting a installation section of said upper lacy section 5A is inserted. In a vehicle body inside edge section (the lower edge of FIG. 2) of this strut section 5A1, a pressure welding glassy fragment 5A2 consisting of a plate form projecting member is arranged, and this pressure welding glass fragment 5A2 is pressed contiguously against an edge section of the front windshield 3 from a vehicle body inside (the lower side of FIG. 2). Furthermore, on a vehicle body outside edge (the upper edge of FIG. 2) relating to a strut section 5A1 of said upper lacy section 5A, a lip form glass side decorative section 5A3 and a panel side decorative section 5A4 are arranged in succession. The glass side decorative section 5A3 extends from said strut section 5A1 toward the front windshield side 3, and is pressed contiguously against a vehicle body outside surface of the front windshield 3 so as to be sealed. The glass side decorative section 5A3 and said pressure welding glass fragment 5A2 extend approximately in parallel, and between them, a concave groove having a width approximately equal to a thickness of the front windshield 3 is compartmented. In this concave groove, an upper side edge (the left edge of FIG. 2) of the front windshield 3 is embedded.

On the one hand, said panel side decorative section 5A4 extends toward a roof panel 1 side on the opposite side of the extending direction of the glass side decorative section 5A3, and this extending edge section is pressed contiguously against a vehicle body outside surface of the roof panel 1 so as to be sealed.

A structure of a side lacy section 5B is explained hereinafter.

The side lacy section 5B is installed in succession from a pillar upper side toward its lower side through a corner lacy section 5C after starting from said upper lacy section 5A. Both the cross sectional form and the installed structure are shown in FIG. 1 and FIG. 3.

In a side section, a front edge section of a pillar panel 2 is bent in a stairs form so as to have a height difference denting toward a vehicle body inside (the lower side of FIG. 3), and through a vehicle body inside bending section 2a, a flange section 2b extending to the front windshield 3 side is arranged. A height of the vehicle body inside bending section 2a becomes higher than the vehicle body inside bending section 1a of said roof panel 1. That is, the vehicle body inside bending section 2a starts to rise gradually from the middle of a corner section as shown in FIG. 4 in the first place, and continues to the highest condition at a corner side of the side section as shown in FIG. 3. Furthermore, toward the lower side of the side section, the highest condition as shown in FIG. 3 remains as it is. On the one hand, since said front windshield 3 is stuck fast so as to keep a certain height against the flange section 2b, according to a rise of said vehicle body inside bending section 2a, a height difference formed between a vehicle body outside surface of a pillar panel 2 (the upper side of FIG. 3) and a vehicle body outside surface of the front windshield 3 is expanding from the corner section to the side section.

Though a strut section 5B1 of a side lacy section 5B continues from a strut section 5A1 of said upper lacy section 5A through the corner section, the strut section 5B1 in this side section is constituted in a cross sectional form different from the strut section 5A1 of the upper lacy section 5A. That is, this strut section 5B1 of this side lacy section 5B is arranged in a position where it projects from the front windshield 3 to a vehicle body outside and at the same time on an edge surface of a vehicle body inside of this strut section (the lower side of FIG. 3), a strut leg section 5B5 projecting toward a vehicle body inside in a long and narrow form is arranged.

Figure 3:
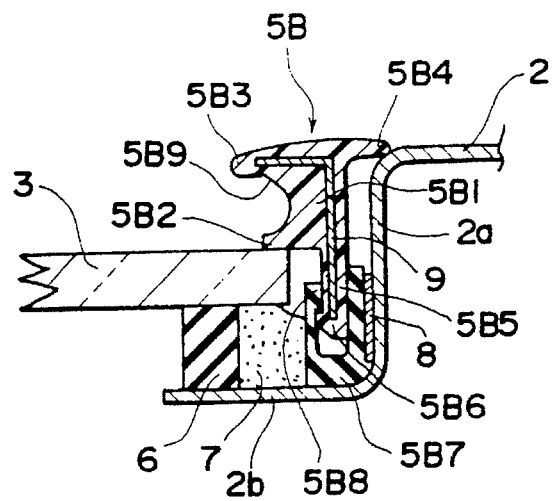
FIG. 3 is a cross sectional view taken along line 3—3 in FIG. 2.

An edge section of a vehicle body inside of said strut section 5B1 (the lower side of FIG. 3) is molded as a plate form pressure welding glass fragment 5B2, and the bottom surface of this pressure welding glass fragment 5B2 is pressed contiguously against a side edge section of the front windshield 3 from a vehicle body outside (the upper side of FIG. 3).

Furthermore, said strut leg section 5B5 in inserted into a long and narrow form space section between the front windshield 3 and the vehicle body inside bending section 2a, and a connecting and fixing fragment 5B6 arranged on to the tip section of this strut leg section 5B5 (the lower edge section of FIG. 3) in a hooked shape is embedded and stuck fast in a fastener 5B7 fixed on a panel side.

The fastener 5B7 is constituted from an approximately U shape cross sectional extruding member opening toward a vehicle body outside (the upper side of FIG. 3), and its bottom surface section is loaded on to the flange section 2b of said pillar panel 2. A loaded position of this fastener 5B7 is arranged in a bending section of the vehicle body inside bending section 2a, and with a double adhesive tape sticking on the inside wall surface of this vehicle body inside bending section 2a, the fastener 5B7 is stuck fast. Furthermore, in a vehicle body outside opening edge section of the fastener 5B7, a connection fixing fragment 5B8 is formed in a hooked shape, and by embedding a connecting and fixing fragment 5B6 of said strut leg section 5B5 inserted into the fastener 5B7 in said connection fixing fragment 5B8, a fixation of the side lacy section 5B is performed.

Furthermore, on to a vehicle body outside edge of said strut section, a glass side decorative section 5B3 having a lip form and a panel side decorative section 5B4 are arranged in succession so as to diverge from a strut section 5B1. The glass side decorative section 5B3 and the panel side decorative section 5B4 continue sequentially in the same form to a glass side decorative section 5A3 and a panel side decorative section 5A4 in said upper lacy section 5A. Among these, the glass side decorative section 5B3 is set to be opposed approximately in parallel at regular intervals toward a vehicle body outside direction from said pressure welding glass fragment 5B2, and between this glass side decorative section 5B3 and pressure welding glass fragment 5B2, a rainwater drain channel 5B9 is compartmented in an approximately semicircular cross sectional form. This rainwater drain channel 5B9 has a function for gathering water on the front windshield 3, and continues from the side lacy section 5B to the middle section of the corner lacy section 5C along the side edge of the front windshield 3, and disappears approximately at the central section.

Furthermore, in this side lacy section, an approximately L shape cross sectional form metallic lacy body 9 is embedded as an insert core material from said glass side decorative section 5B3 to the strut section 5B1 and a strut let section 5B5 so as to constitute a molding supporting frame. This metallic lacy body 9 is arranged only in the side lacy section 5B, but not arranged in said upper lacy section 5A and the corner lacy section 5C.

Next, the corner lacy section 5C is shown in FIG. 4. The corner lacy section 5C has a glass side decorative section 5C3 and a panel side decorative section 5C4. These glass side decorative section 5C3 and panel side decorative section 5C4 continue in the same form seamlessly as one united body to the glass side decorative section 5A3 and 5B3 and the panel side decorative section 5A4 and 5B4 in said upper lacy section 5A and side lacy section 5B. To the illustrated lower section of these both decorative sections 5C3 and 5C4, a pillar form auxiliary lacy body 5C5 is connected as one united body by an injection molding.

On a sidewall of said auxiliary lacy body 5C5, a concave groove to receive a corner edge section of the front windshield 3 is formed and at the same time a pressure welding glass fragment 5C2 compartmenting a vehicle body outside sidewall section of this concave groove is arranged so as to continue to a pressure welding glass fragment 5B2 of said side lacy section 5B approximately in the same plate form.

On the one hand, a supporting section 5C10 arranged in the upper edge section of this auxiliary lacy section 5C5 is raised gradually from an upper section side part toward a side section side part in its molded height in a vehicle body inside direction (illustrated vertical direction). This is corresponding to a height difference change between said vehicle body panel and its windshield, and according to this height change of this auxiliary lacy body 5C5, the upper lacy section 5A and the side lacy section 5B are set to be installed consecutively.

In this way, according to this embodiment, while keeping a decorative section in the same cross sectional form, a cross sectional form of an installation section arranged on the lower side of said decorative section is transformed according to its installed condition, and accordingly while obtaining a monolithic decorative sense through an overall length of a molding 5, an overall length of it is set to be installed satisfactorily.

Furthermore, with a position regulating force of metallic lacy body 9 arranged in the side lacy section 5B, an installing position height of the front windshield 3 is maintained uniformly. Furthermore, since this metallic lacy body 9 is not arranged in the corner lacy section 5C and the upper lacy section 5A, in case of storing or transporting the molding 5, it is possible to be transformed into an optional form. Furthermore, since said metallic lacy body 9 is a short size form to be arranged only in the side lacy section 5B, a bending process can be performed even by a small size machine or mold.

A manufacturing device of such automobile windshield molding 5 will be explained hereinafter.

Figure 6:
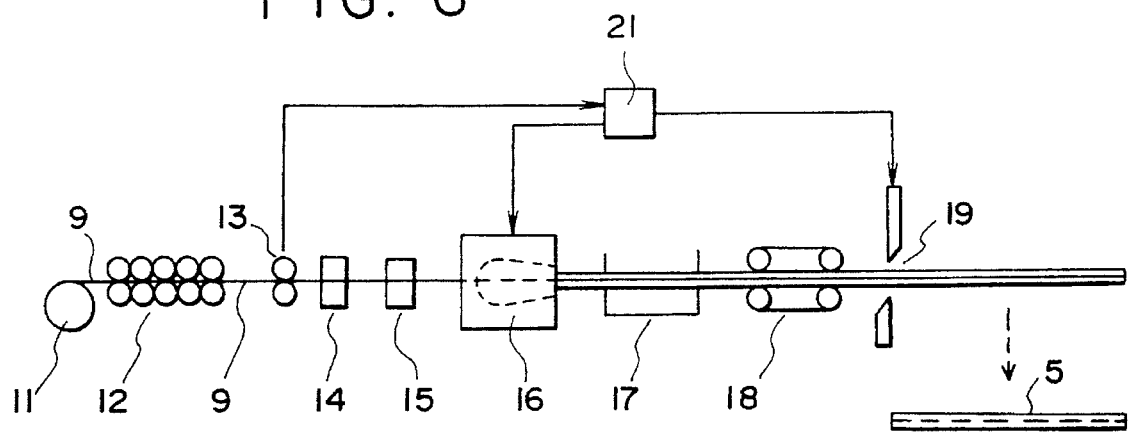
FIG. 6 is an explanatory side view showing an example of a manufacturing device to mold a molding of the present invention.

As shown in FIG. 6, after being bent in a predetermined cross sectional form by a forming roll 12, a raw material of a metallic lacy body 9 drawn out from a coiler 11 is supplied to a extruding metal mold device 16 through a detector 13, an adhesive applying device 14 and a high frequency printing device 15 to perform an extrusion molding into a cross sectional form together with resin as one united body. An extruded molding material is sent to a cutter 19 by a receiver 18 through a refrigerating tank 17 to be cut into a predetermined length there.

At this time, since a feed volume of an insert material 9 detected by said detector 13 is impressed in a controller 21, according to this input signal, a operation timing of said extruding metal mold device 16 and the cutter 19 is decided so that operation signals are outputted from the controller 21 to each device 16 and 19. Furthermore, since an arranging position of the detector 13 can be set anywhere if it is a position capable of detecting a running volume or a moving volume of materials, for example, it can be arranged even in either the front or the rear side of the receiver 18.

Figure 7:
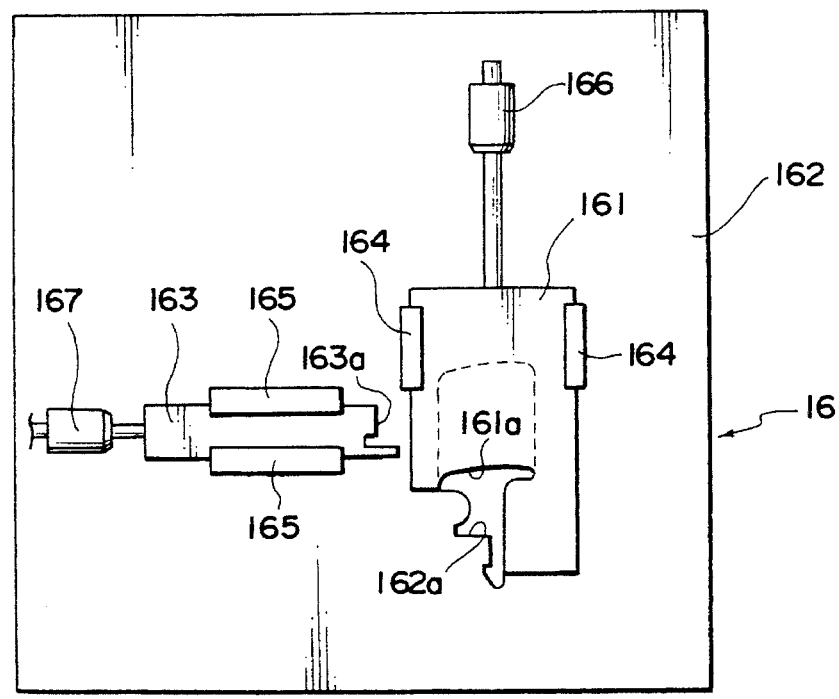
FIG. 7 is an explanatory front view showing an example of an extruding metal mold device used in a manufacturing device as shown in FIG. 6.

A molding metal mold arranged in said extruding metal mold device 16 has the first die 161, the second die 162 and the third die 163 arranged in parallel toward the molding extruding direction (vertical direction to the plane) as shown in FIG. 7. The second die 162 is arranged to be in a fixed condition, and has an extrusion molding gate 162a. This extrusion molding gate 162a has both an opening section creating a contour form corresponding to an installation section of said side lacy section 5B and an opening section creating a contour form extending the decorative section toward the illustrated upper direction.

Furthermore, said first die 161 and third die 163 created respectively from plate form materials are supported by a pair of guide bodies 164, 164 and 165,165 so as to be movable in parallel on the front surface of said second die 162. An extrusion molding gate 161a arranged in the first die 161 is created by being notched into a contour form corresponding to between an upper edge of a decorative section of a windshield lace and an outside peripheral sidewall section, and is superposed upon a predetermined position against the extrusion molding gate 162a of said second die 162. This first die 161 is constituted so as to perform a reciprocating movement between a side lacy section forming position as shown in FIG. 7, a corner lacy section forming position as shown in FIG. 8 and an upper lacy section forming position as shown in FIG. 9 with a driving force from a driving motor 166.

Furthermore, in the tip section of third die 163, an extrusion molding gate 163a having a contour form corresponding to an inside peripheral sidewall section of an installation section of an upper lacy section 5A is created by being notched. This third die 163 is constituted so as to perform a reciprocating movement in the direction crossing at right angles to the moving direction of said first die 162 with a driving force from a driving motor 167. As described later, this third die 163 enters an extrusion molding gate when the first die 161 is put under the most separate opening condition against a die 162 of said die 2.

Figure 19:
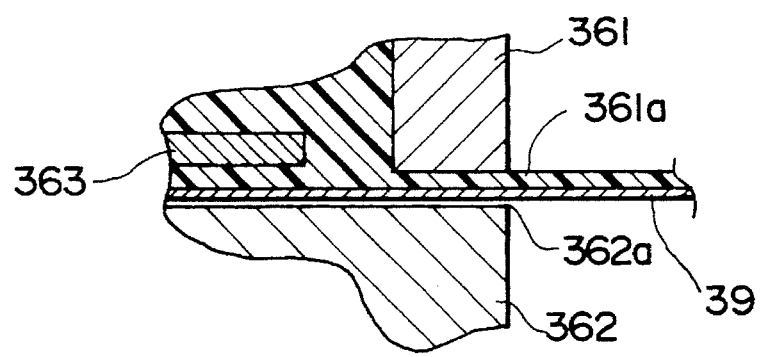
FIG. 19 is a fragmentary longitudinal view taken along line 19—19 as shown in FIG. 18.

In case of performing an extrusion molding on the side lacy section 5B with a structural die of this kind, as shown in FIG. 7 in the first place, the second die 162 and the first die 161 are kept in the most adjacent opening condition. In this side section extruding process, since an extrusion molding gate having a certain form corresponding to the side lacy section 5B is compartmented in dies, by means of this, an extrusion molding of the side lacy section 5B as shown in FIG. 19 is performed. At this time, a metallic lacy body 9 is supplied to a prescribed position in an extrusion molding gate to be extruded form there together with resin materials as one united body.

Figure 8:
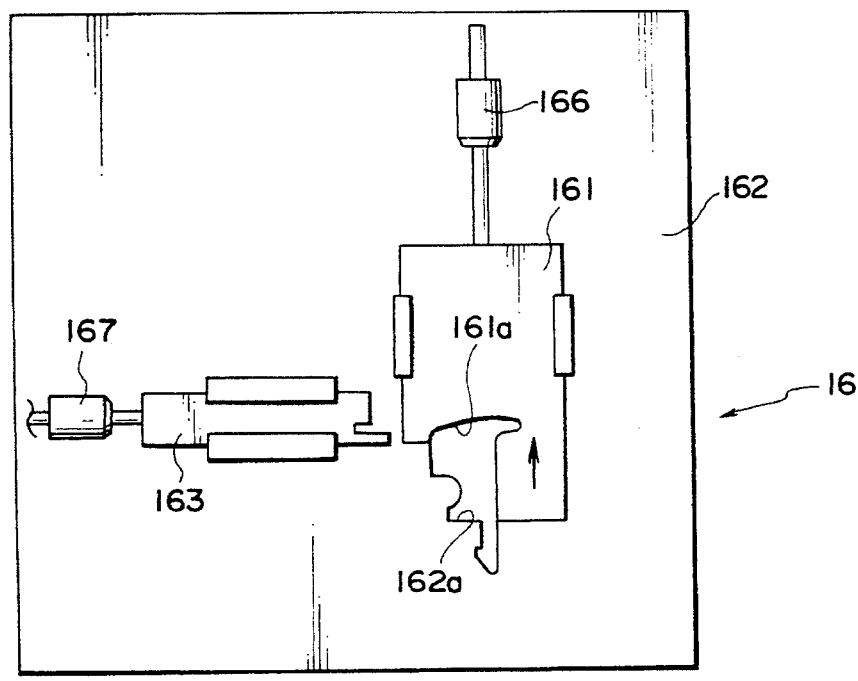
FIG. 8 is an explanatory front view showing a condition that a die of an extruding metal mold device as shown in FIG. 7 is moved.
Figure 9:
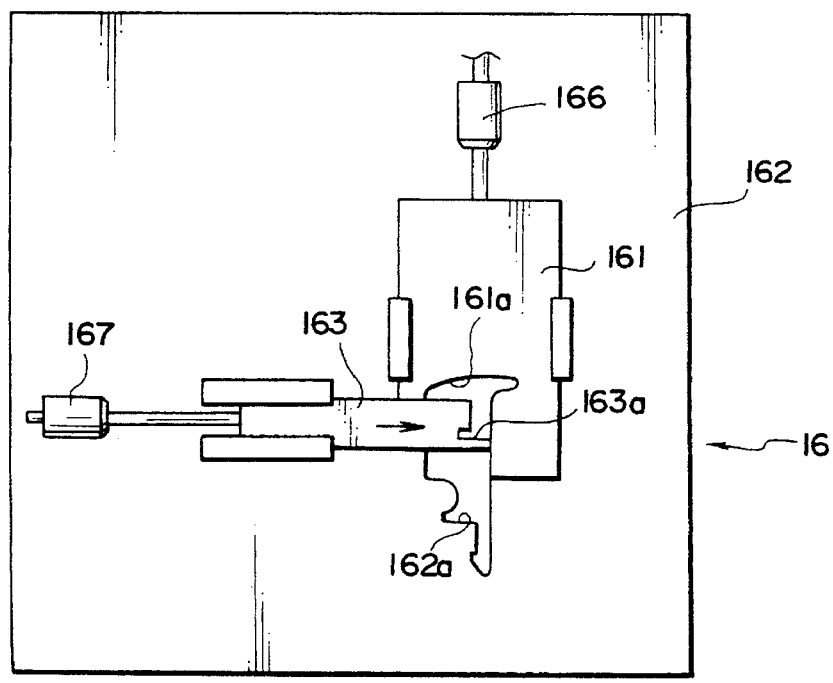
FIG. 9 is an explanatory front view showing another moving condition that a die of an extruding metal mold device as shown in FIG. 7 is moved.
Figure 10:
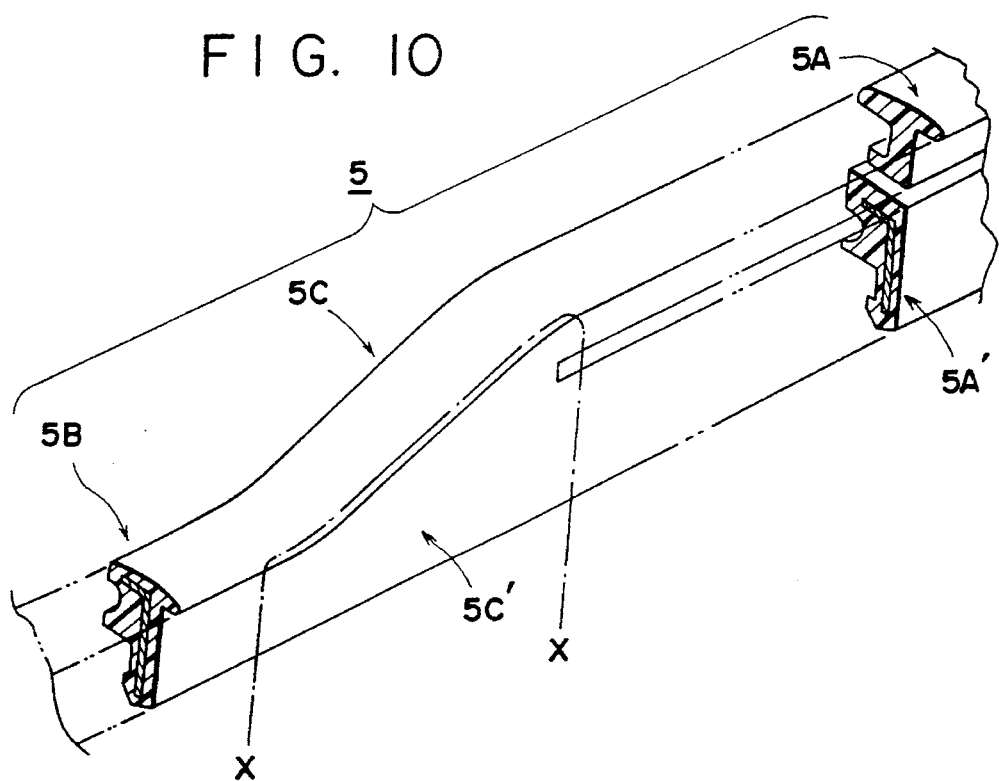
FIG. 10 is a perspective view showing a molding directly after an extrusion molding is performed.

Next, in an extruding process for molding a corner lacy section 5C, as shown in FIG. 8, while the first die 161 are moving separately toward the illustrated upper direction against the second die 162, an extrusion is performed. In this varied extruding process, since an extrusion molding gate for transforming into a form corresponding to the corner lacy section 5C is compartmented in dies, by means of this, an extrusion molding of the corner lacy section 5C as shown in FIG. 10 is performed. Moreover, extruded moldings 5C' corresponding to an installation section are removed as unnecessary parts together with metallic lacy bodies as described later.

Furthermore, in case of performing an extrusion molding on an upper lacy section 5A, as shown in FIG. 9, since in the first place the first die 161 is kept in the most separate opening condition against the second die 162, said third die 163 enters into an extending area of an extrusion molding gate created at that time. In this divided extruding process, an extrusion molding gate having a certain form corresponding to the upper lacy section 5A is compartmented in dies and an extrusion molding on the upper lacy section 5A is performed and at the same time, by means of the third die 163, an extrusion molding gate corresponding to an installation section of the side lacy section 5B is separated from an extrusion molding gate corresponding to the upper lacy section 5A so that the divided extrusion can be performed. According to this divided extrusion, extrusion moldings 5A' including metallic lacy bodies 9 extruded from an extrusion molding gate corresponding to an installation section in the second die 162 are extruded while being separated from said upper lacy section 5A.

Figure 11:
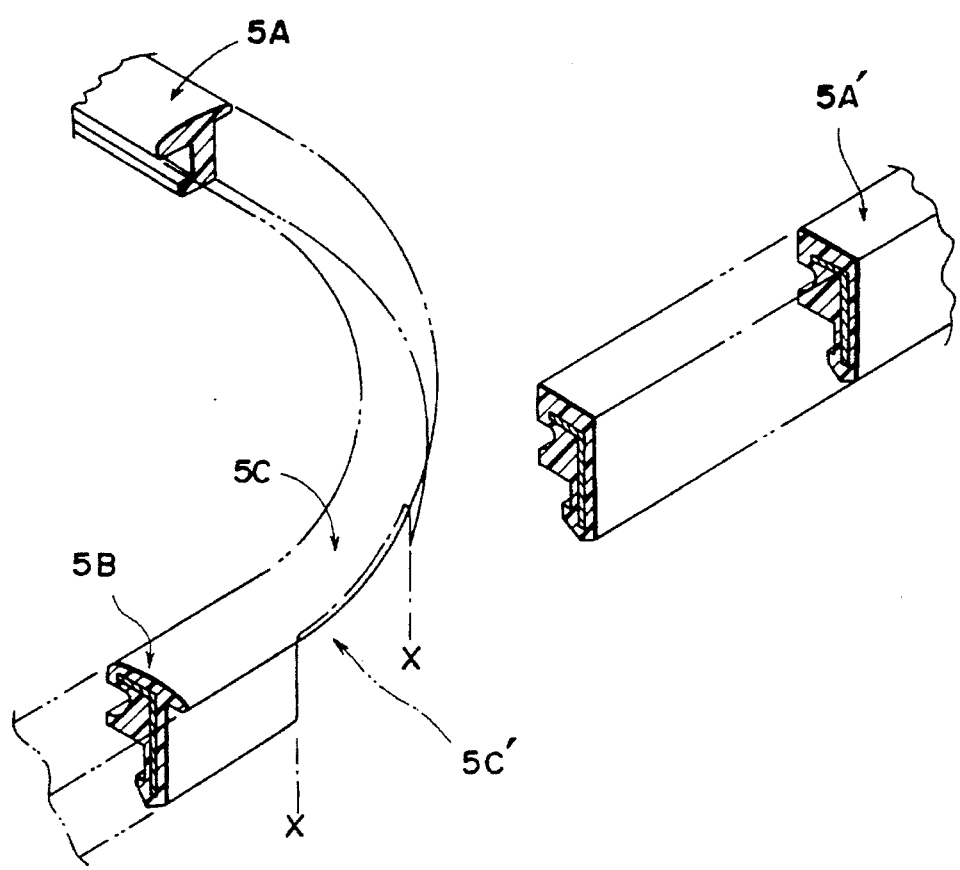
FIG. 11 is a perspective view showing a condition that a part of moldings created by extrusion molding is removed.

A molding material created in this way by performing an extrusion molding is cut along line X—X as shown in FIG. 10 to remove unnecessary parts after being cut into a fixed length with the cutter 19. That is, both the extruded moldings 5A' corresponding to an installation section extruded by said divided extruding process while being separated from the upper lacy section 5A and the extruded moldings 5C' corresponding to an installation section of the corner lacy section are removed as unnecessary parts together with metallic lacy bodies 9 as shown in FIG. 11. Moreover, to a removed section of the corner lacy section, said auxiliary lacy body 5C5 is added after being molded by means of an injection molding.

According to a molding manufacturing method like this, the windshield molding relating to said embodiment can be molded consecutively, easily and accurately with a comparatively small size device.

A construction and an installation structure of a windshield molding 35 relating to the second embodiment of the present invention will be explained hereinafter.

Figure 12:
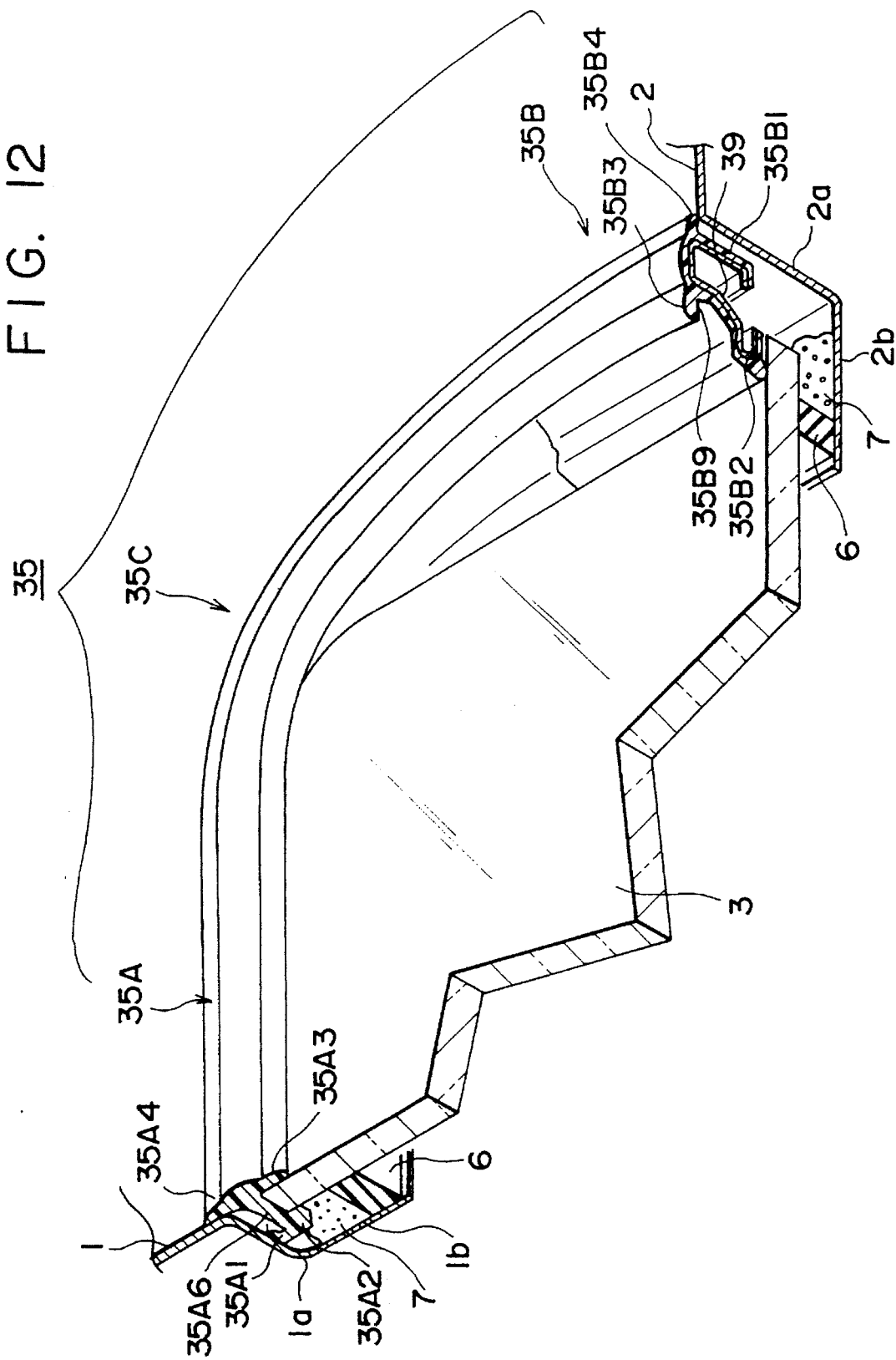
FIG. 12 is a fragmentarily enlarged perspective view showing a structure around a corner of an automobile windshield molding in the second embodiment of the present invention.

As shown in FIG. 12, a lacy body 35 has an upper lacy section 35A, a corner lacy section 35C and a side lacy section 35B, and is installed from the upper edge of the front windshield 3 through the corner edge to both side edges with unillustrated clips. Stairs form bending structures of a roof panel 1 and a pillar panel 2 and an installation structure in this embodiment are the same as said first embodiment.

Figure 13:
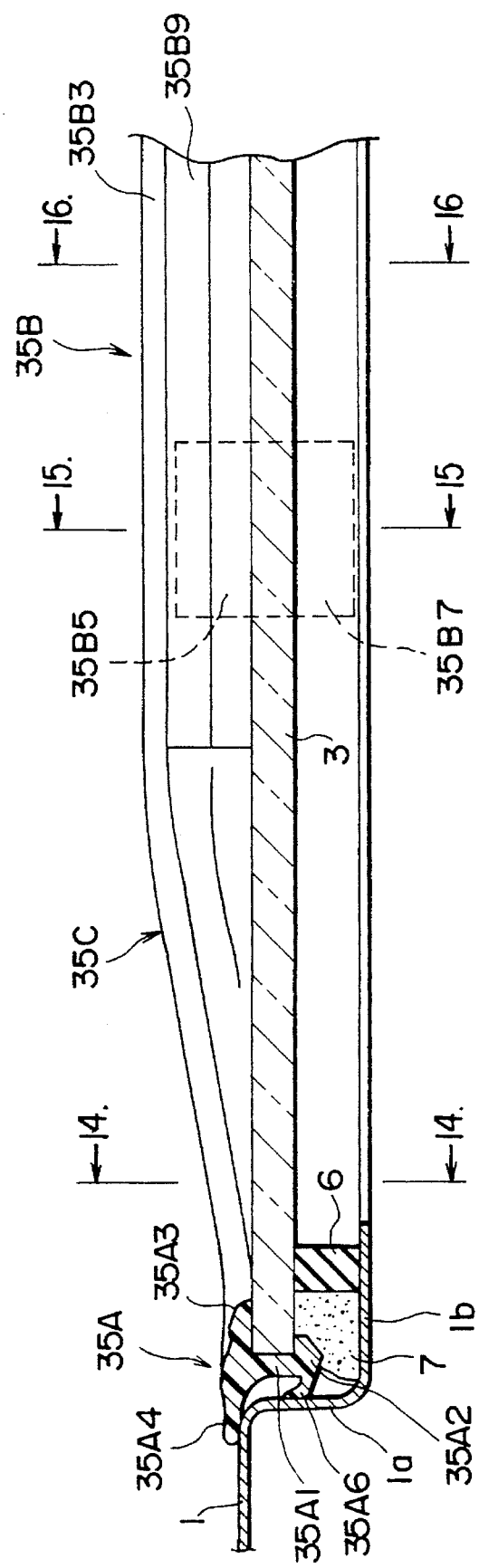
FIG. 13 is a cross sectional view similar to FIG. 2 and showing a structure of an automobile windshield molding as shown in FIG. 12.

In the first place, the upper lacy section 35A has a cross sectional form and an installation structure as shown in FIG. 12 and FIG. 13. Into a space between the front windshield and a vehicle body inside bending section 1a, a strut section 35A1 constituting an installation section of the upper lacy section 35A is inserted, and in a vehicle body inside edge section (the lower edge section of FIG. 13), a pressure welding glass fragment 35A2 and an elastic lip fragment 35A6 consisting of projecting members are respectively arranged projecting-like on both the inside and the outside peripheries. The pressure welding glass fragment 35A2 is pressed contiguously to a vehicle body inside (the lower side of FIG. 13) against the edge section of the front windshield 3 and at the same time the elastic lip fragment 35A6 is pressed continuously against a vehicle body inside bending section 1a. A pressed reaction force caused by bending this elastic lip fragment 35A6 acts as a temporary fixing force until it is fixed with adhesives 7.

Furthermore, on a vehicle body outside edge (the upper edge of FIG. 13) of said strut section 35A1, a glass side decorative section 35A3 and a panel side decorative section 35A4 of lip forms are arranged consecutively on the inside and the outside peripheries. The glass side decorative section 35A3 extends from said strut section 35A1 toward the front windshield 3 side, and is pressed contiguously against a vehicle body outside surface of the front windshield 3 side so as to be sealed. AT this time, said glass side decorative section 35A3 and said pressure welding glass fragment 35A2 extend approximately in parallel, and between them, a concave groove having a width approximately equal to the thickness of the front windshield 3 is compartmented. In this concave groove, the upper side edge (the left side edge FIG. 13) section of the front windshield 3 is embedded.

On the one hand, the panel side decorative section 35A4 starts to extend toward a roof panel 1 side on the opposite side of the extending direction of the glass side decorative section 35A3, and its extended edge section is pressed contiguously against a vehicle body outside surface of the roof panel 1 so as to be sealed.

A structure of a side lacy section 35B will be explained hereinafter.

Figure 14:
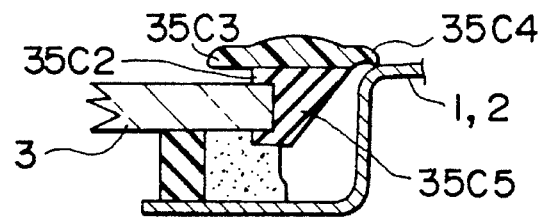
FIG. 14 is a cross sectional view taken along line 14—14 as shown in FIG. 13.
Figure 16:
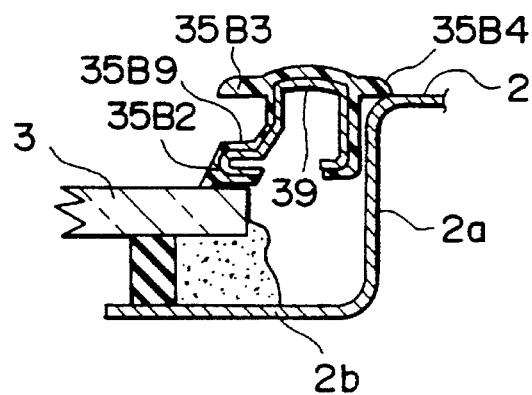
FIG. 16 is a cross sectional view taken along line 16—16 as shown in FIG. 13.

The side lacy section 35B is the one to be installed consecutively from a pillar upper side toward its lower side through the corner lacy section 35C by starting from said upper lacy section 35A, and its cross sectional form and installation structure are shown in FIG. 12, FIG. 14 and FIG. 16.

Though a strut section 35B1 of the side lacy section 35B continues through a corner section from the strut section 35B1 of said upper lacy section 35A, the strut section 35B1 in this side section is constituted in a hollow cross sectional form different from the strut section 35A1 of the upper lacy section 35A. This hollow start section 35B1 is arranged in a position for projecting it from the front windshield 3 to a vehicle body outside, and on the hollow inside wall section, a metallic lacy body 39 is covered as a core material so as to constitute a molding supporting frame. This metallic lacy body 39 is arranged only in the side lacy section 35B, but not arranged in said upper lacy section 35A and corner lacy section 35C.

A wall section of the inside periphery (the illustrated left side) of said strut section 35B1 and the metallic body 39 is created in a concave and convex form, as described later, in a section direction under a glass side decorative section 35B3, rainwater drain channel 35B9 having an approximately ⌐shape cross section is compartmented. Though an illustrated lower sidewall section of this rainwater drain channel is constituted from a concave section of the strut section 35B1 and the metallic lacy body 39, since this concave section is molded as the pressure welding glass fragment 35B2, a vehicle body inside (the lower side of FIG. 3) edge section of said pressure welding glass fragment 35B2 is pressed contiguously from a vehicle body outside against a side edge of the front windshield 3.

Figure 15:
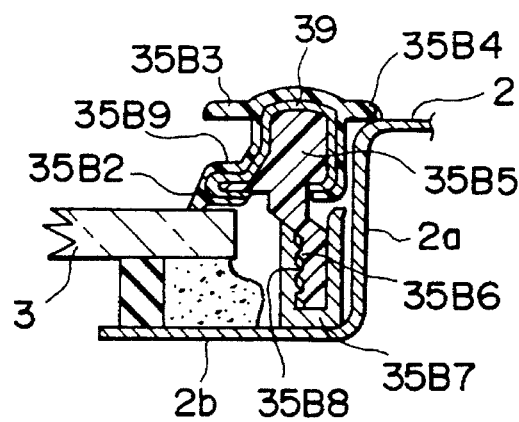
FIG. 15 is a cross sectional view taken along line 15—15 as shown in FIG. 13.

Furthermore, as shown in FIG. 15, in the hollow inside of said strut section 35B1 and the metallic lacy body 39, plural strut leg sections 35B5 are embedded in the lengthwise direction at regular intervals. Each of these strut leg sections 35B5 are inserted into a long and narrow space section between the front windshield 3 and the vehicle body inside bending section 2a, and in its tip section (the lower edge section of FIG. 15), a connecting and fixing fragment 35B6 arranged in a hooked shape is embedded and stuck fast into a clip 35B7 fixed on a panel side.

Said clip 35B7 is arranged approximately in the same position with an arranged position of the strut leg section 35B5, the bottom surface section of said clip 35B7 constituted in an approximately U shape cross section opening toward a vehicle body outside (the upper side of FIG. 15) is loaded on to the flange section 2b of said pillar panel 2. In a vehicle body outside opening edge section of this clip 35B7, a connecting and fixing fragment 35B8 is formed in a hooked shape, and the connecting and fixing fragment 35B6 of said strut leg section 35B5 inserted into said clip 35B7 fixes the side lacy section 35B by being embedded in said connecting and fixing fragment 35B8.

Furthermore, on a vehicle body outside edge (the upper side of FIG. 15) of said strut section 35B1, the glass side decorative section 35B3 formed in a lip shape and the panel side decorative section 35B4 are arranged consecutively so as to be diverged from the strut section 35B1. The glass side decorative section 35B3 and the panel side decorative section 35B4 continue seamlessly and sequentially in the same form as one united body to the glass side decorative section 35A3 and the panel side decorative section 35A4 in said upper lacy section 35A. Among them, the glass side decorative section 35B3 is opposed approximately in parallel at regular intervals from the pressure welding glass fragment 35B2 toward a vehicle body outside as described above, and between this glass side decorative section 35B3 and the pressure welding glass fragment 35B2, a rainwater drain channel is compartmented. This rainwater drain channel has a function for gathering water on the front windshield 3, and continues from the side lacy section 35B to the middle section of the corner lacy section 35C along the side edge of the front windshield 3, and disappears approximately in the center of the corner section.

Next, the corner lacy section 35C is shown in FIG. 14. The corner lacy section 35C has a glass side decorative section 35C3 and a panel side decorative 35C4. The glass side decorative section 35C3 and the panel side decorative section 35C4 continue sequentially in the same form to the glass side decorative sections 35A3 and 35B3 and the panel side decorative sections 35A4 an 35B4 in said upper lacy section 35A and side lacy section 35B, and in the illustrated lower side section of these both decorative sections 35C3 and 35C4, a pillar form auxiliary lacy body 35C5 is connected as one united body by an injection molding.

On the sidewall of said auxiliary lacy body 35C5, a concave groove to receive a corner edge section of the front windshield 3 is formed and at the same time the pressure welding glass fragment 35C2 compartmenting a vehicle body outside sidewall section of that concave groove is arranged so as to continue approximately in the same plate form to the pressure welding glass fragment 35B2 of the side lacy section 35B.

On the one hand, a molded height of this auxiliary lacy body 35C5 in a vehicle body outside direction (illustrated vertical direction) is raised gradually from the upper section side part toward the side section side part. This corresponds to a height difference change between a vehicle body panel and a windshield and according to a height change of this auxiliary lacy body 35C5, the upper lacy section 35A and the side lacy section 35B are installed consecutively.

In this way, according to this embodiment, while keeping the decorative section in the same cross sectional form against different vehicle body panel forms, a cross sectional form of the installation section arranged on the lower side of said decorative section is varied according to its installation condition and accordingly, while obtaining a monolithic decorative sense through an overall length of a molding 35, its overall length is set to be installed satisfactorily.

Furthermore, with a position regulating force of the metallic lacy body 39 arranged in the side lacy section 35B, an installation height position of the front windshield 3 can be kept uniformly. Moreover, since this metallic lacy body 39 is not arranged in the corner lacy section 35C and the upper lacy section 35A, in case of storing or transporting the molding 35, it is allowed to be transferred into an optional form. Furthermore, since said metallic lacy body 39 is a short size form to be arranged only in the side lacy section 35B, its bending process can be performed by a small size machine or mold.

Figure 18:
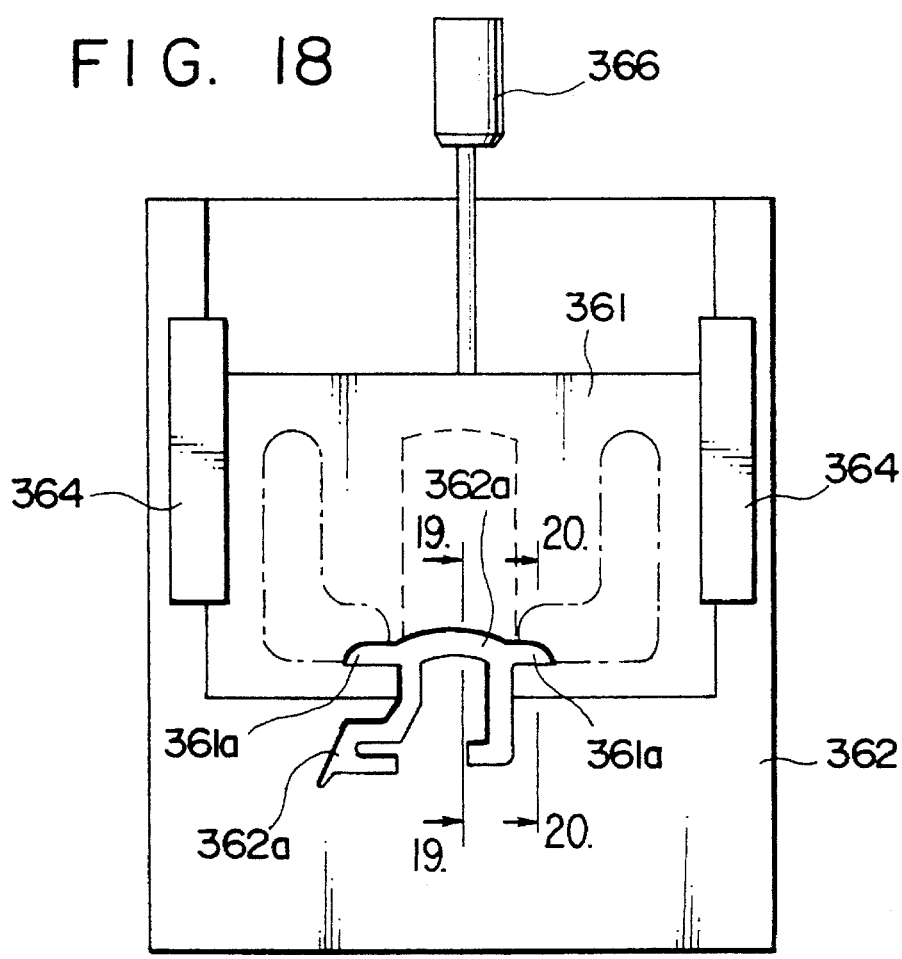
FIG. 18 is an explanatory front view showing an example of an extruding metal mold device used in a manufacturing device to mold a windshield molding in the second embodiment of the present invention.
Figure 20:
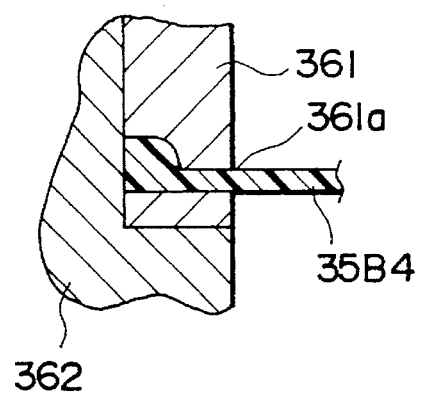
FIG. 20 is a fragmentary longitudinal view taken along line 20—20 as shown in FIG. 18.

A manufacturing device for such automobile windshield molding 35 will be explained hereinafter. Though the whole device is the same with the one as shown in FIG. 6, a molding metal mold in this embodiment has the first die 361 and the second die 362 arranged in parallel in the molding extruding direction (vertical direction to the plane) and the third die 363 accommodated inside of an extrusion molding gate compartmented with the first die 362 and the second die 362, as shown in FIG. 18, FIG. 19 and FIG. 20.

The second die 362 is arranged in a fixed condition, and has an extrusion molding gate 362a. This extrusion molding gate 362a has an opening section having a contour form corresponding to the installation section of said side lacy section 35B and an opening section having a contour form extending the middle part of the decorative section toward the illustrated upward direction.

Furthermore, said first die 361 and third die 363 are created respectively from a plate form member and a box form member, and whereas the first die 361 is supported on the front surface of the second die 362 with a pair of guide bodies 364 and 364 so as to be movable in parallel in the direction crossing at right angles to a molding extruding direction, the third die 363 is supported inside of the extrusion molding gate 362a of the first die 361 with an unillustrated guide body so as to be movable in parallel in the molding extruding direction.

An extrusion molding gate 361a arranged in the first die 361 is created by being notched into a contour form corresponding to a part of an illustration section continuing to the whole decorative section of a molding 35 and its decorative section, a part corresponding to the central part of the decorative section is superposed upon the extrusion molding gate 362a of said second die 362 and at the same time a part corresponding to both edge parts of the decorative section is superposed upon both sidewall surfaces of the extrusion molding gate 362a of said second die 362. This first die 361 is constituted so as to perform a reciprocating movement between a side lacy section forming position as shown in FIG. 18, a corner lacy section forming position as shown in FIG. 21 and an upper lacy section forming position as shown in FIG. 23 with a driving force from a driving motor 366.

Figure 23:
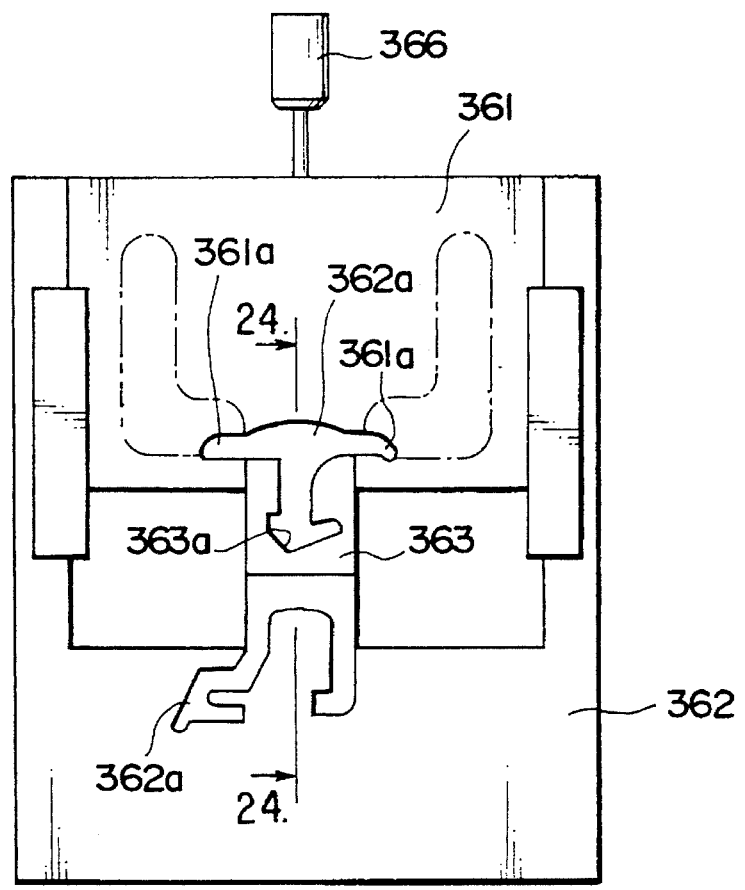
FIG. 23 is an explanatory front view showing another moving condition that a die of an extruding metal mold device as shown in FIG. 18 is moved further.

Furthermore, especially as shown in FIG. 23, in said third die 363, an extrusion molding gate 363a having a contour form corresponding to an illustration section of an upper lacy section 35A is created by being notched. This third die 363 is constituted so as to perform a reciprocating movement in the molding extruding direction with a driving force from an unillustrated driving motor. As described later, this third die 363 is extruded to this side in the front of the extruding direction when the first die 361 is put under the most separate opening condition against the die 362 of said die 2.

Figure 17:
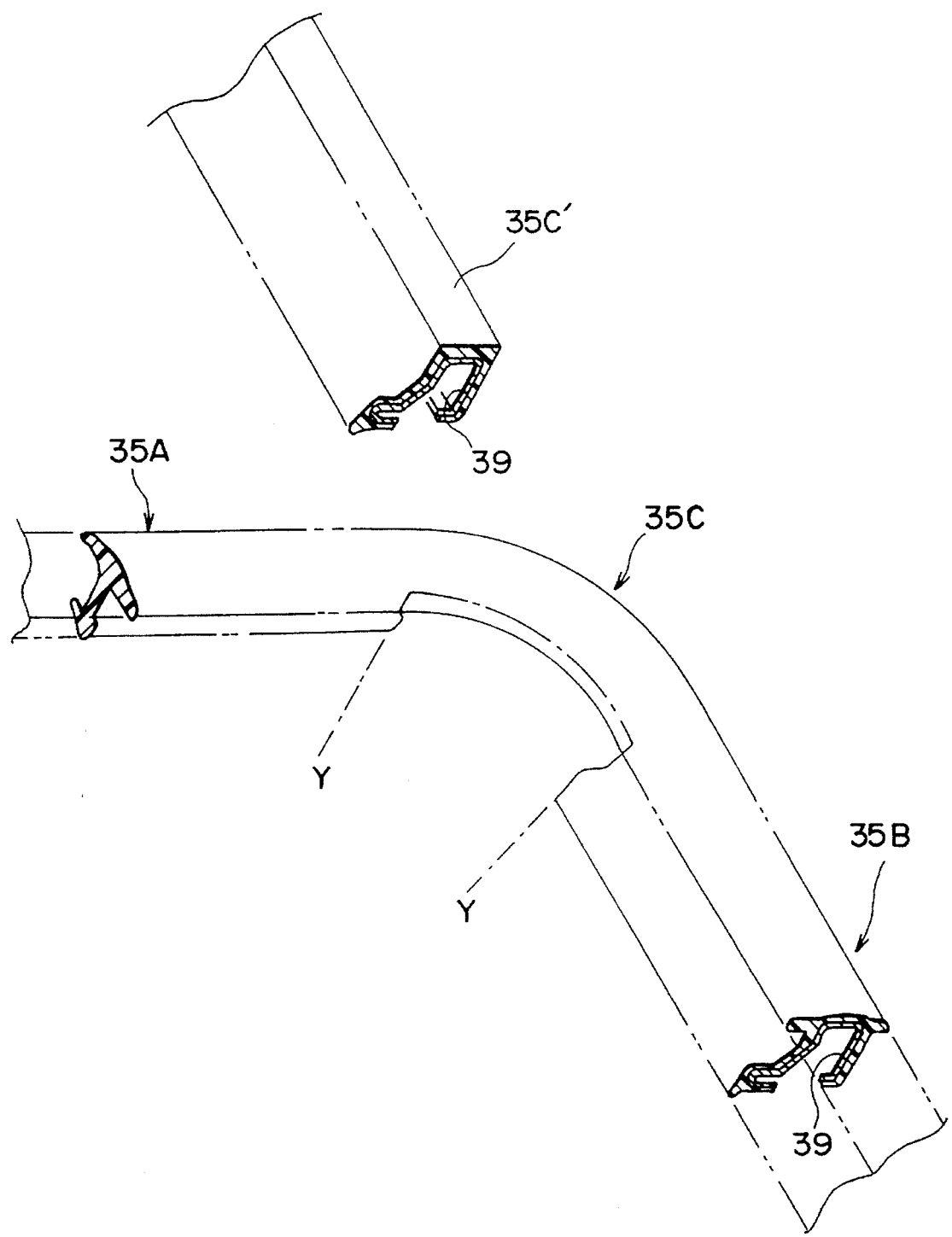
FIG. 17 is a perspective view showing a condition that a part of molding created by an extrusion molding is removed.

In case of performing an extrusion molding on the side lacy section 35B by this structural die, in the first place, as shown in FIG. 18, FIG. 19 and FIG. 20, the second die 362 and the first die 361 are kept in the most adjacent opening condition. In this side section extruding process, an extrusion molding gate having a prescribed form corresponding to the side lacy section 35B is compartmented in dies, and by means of this, an extrusion molding of the side lacy section 35B as shown in FIG. 17 is performed. At this time, the metallic lacy body 39 is supplied to a prescribed position within the extrusion molding gate to be extruded together with resin materials as one united body.

Figure 21:
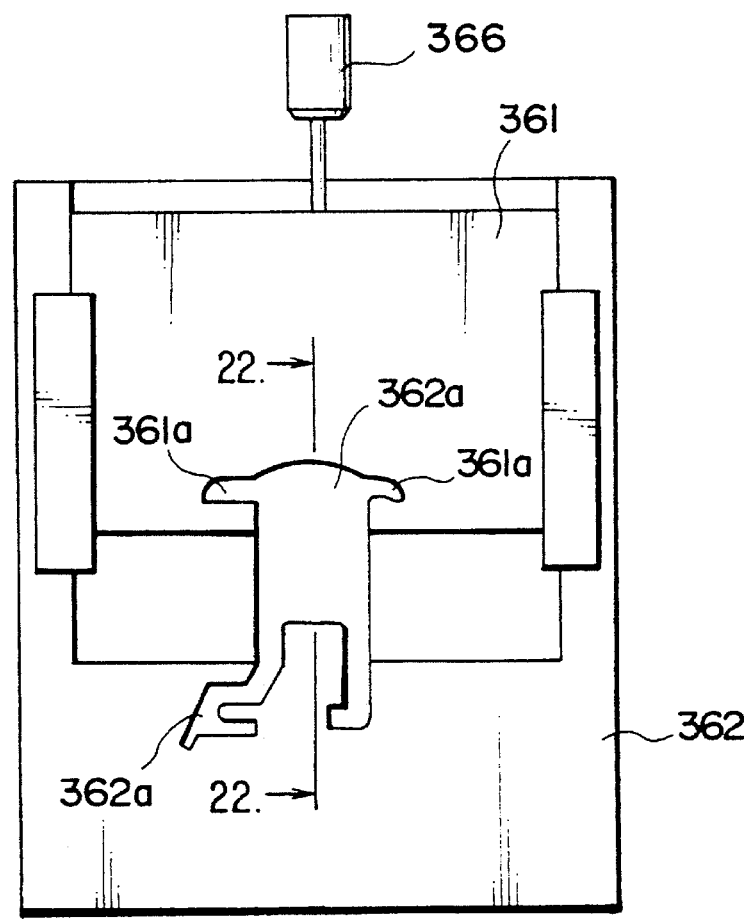
FIG. 21 is an explanatory front view showing a condition that a die of an extruding metal mold device as shown in FIG. 18 is moved.
Figure 22:
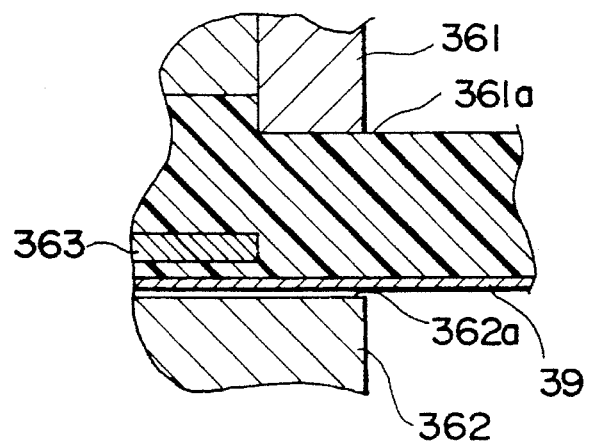
FIG. 22 is a fragmentary longitudinal view taken along line 22—22 as shown in FIG. 21.

Next, in an extruding process for molding the corner lacy section 35C, as shown in FIG. 21 and FIG. 22, an extrusion is performed while the first die 361 is moving separately toward the illustrated upward direction against the second die 362. In this varied extruding process, an extrusion molding gate transforming into a form corresponding to the corner lacy section 35C is compartmented in dies, and by means of this, an extrusion molding on the corner lacy section 35C as shown in FIG. 17 is performed. Moreover, as described later, extruded moldings 35C' corresponding to an installation section are removed as unnecessary parts together with the metallic lacy body 39.

Figure 24:
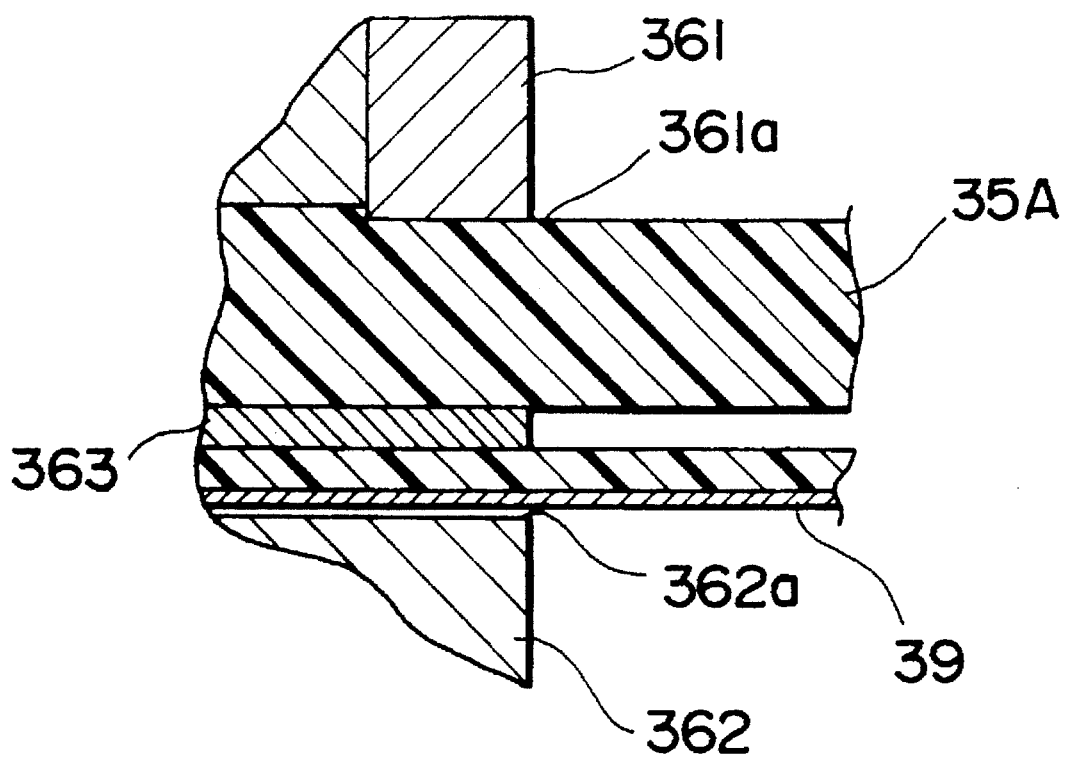
FIG. 24 is a fragmentary longitudinal view taken along line 24—24 as shown in FIG. 23.

Furthermore, in case of performing an extrusion molding on the upper lacy section 35A, as shown in FIG. 23 and FIG. 24, in the first place, the first die 361 is kept in the most separated opening condition against the second die 362, and said third die 363 enters an extending area of an extrusion molding gate molded at that time from the interior side the molding extruding direction toward this side in the front. In this divided extruding process, an extrusion molding gate having a certain form corresponding to the upper lacy section 35A is compartmented in dies, and an extrusion molding on the upper lacy section 35A is performed and at the same time by the third die 363, the extrusion molding gate corresponding to an installation section of the side lacy section 35A is separated form the extrusion molding gate corresponding to the upper lacy section 35A so that a divided extrusion is performed. According to this divided extrusion, extruded moldings 35A' including the metallic lacy body 39 form an extrusion molding gate corresponding to an installation section in the second die 362 are extruded while being separated from said upper lacy section 35A.

A molding material created by an extrusion molding in this way is cut along line Y—Y as shown in FIG. 17 to remove unnecessary parts after being cut uniformly by a cutter 19 as shown in FIG. 6. That is, both extruded moldings 35A' corresponding to an installation section extruded by said divided extruding process while being separated from the upper lacy section 35A and extruded moldings 35C' corresponding to an installation section of the corner lacy section are removed as unnecessary parts together with a metallic lacy body 39 as shown in FIG. 17. Furthermore, to a removed section of the corner lacy section 35C, said auxiliary lacy body 35C5 is added by means of an injection molding.

According to this molding manufacturing method, the windshield molding 35 relating to said embodiment can be molded easily, accurately and furthermore consecutively by a comparatively small size device.

Figure 25:
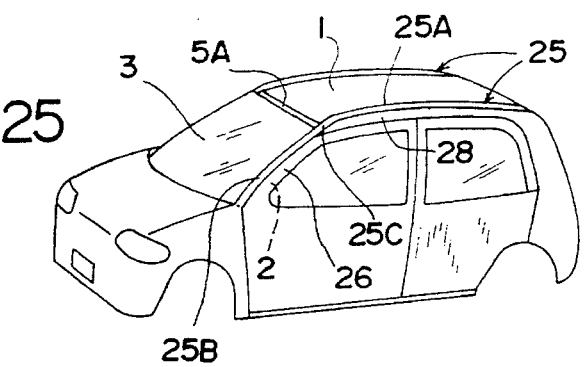
FIG. 25 is a perspective view showing an external appearance on the front side of other automobile example according to the present invention.
Figure 29:
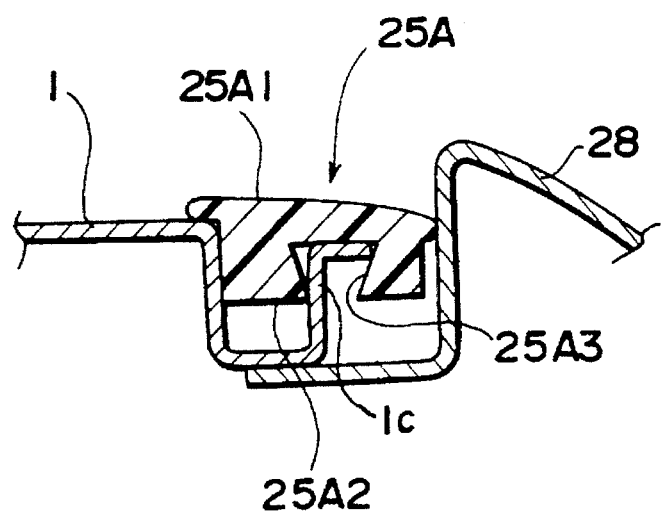
FIG. 29 is a cross sectional view showing a structure of an automobile roof side section as shown in FIG. 25.

Next, a molding 25 in an embodiment as shown in FIG. 25 or FIG. 29 is installed consecutively from both side sections of an automobile front windshield 3 to both side sections of a roof panel 1.

Figure 26:
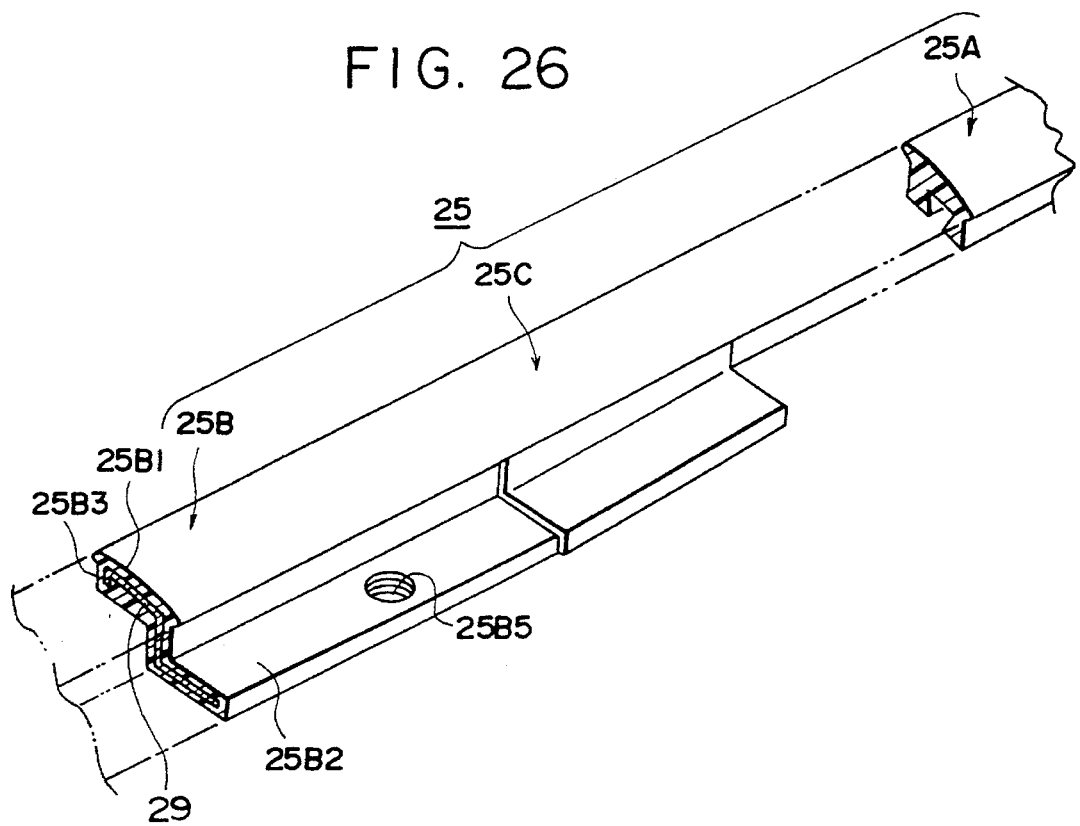
FIG. 26 is a perspective view showing a condition after an extrusion molding on a molding in the third embodiment used for an automobile as shown in FIG. 25.
Figure 27:
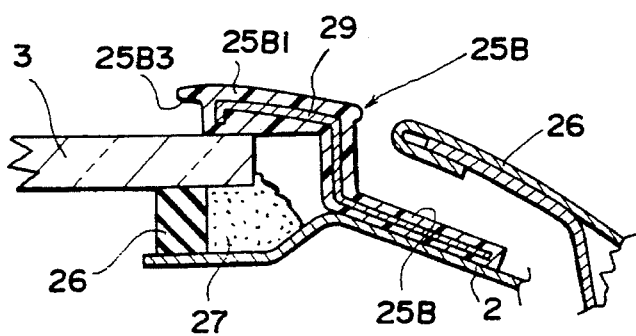
FIG. 27 is a cross sectional view showing a structure of an automobile front wind side part as shown in FIG. 25.

In the first place, as shown in FIG. 25, FIG. 26 and FIG. 27, in a front windshield side section, a front windshield 3 is stuck fast to a side pillar panel 2 through a dam rubber 26 and adhesives 27, and from an edge section of a side section of this front windshield 3 to the side pillar pane 2, a windshield side lacy section 25B is installed.

The windshield side lacy section 25B is constituted from a decorative section 25B1 for being pressed contiguously against a vehicle body outside surface of the front windshield 3 and an installation section 25B2 for being contiguously against a vehicle body surface of the side pillar panel 2, a height difference corresponding to a height difference between a vehicle body outside surface of the front windshield and a vehicle body outside surface of the side pillar panel 2 is formed. On the inside peripheral sidewall surface, a rainwater drain channel is arranged concavely and at the same time, from the decorative section 25B1 to the installation section 25B2, a metallic lacy body 29 is embedded inside. Furthermore, in said installation section 25B2, a fixing hole 25B5 is formed piercingly, and furthermore on the outside of this installation section 25B2, a door panel 26 is arranged at regular intervals.

Figure 28:
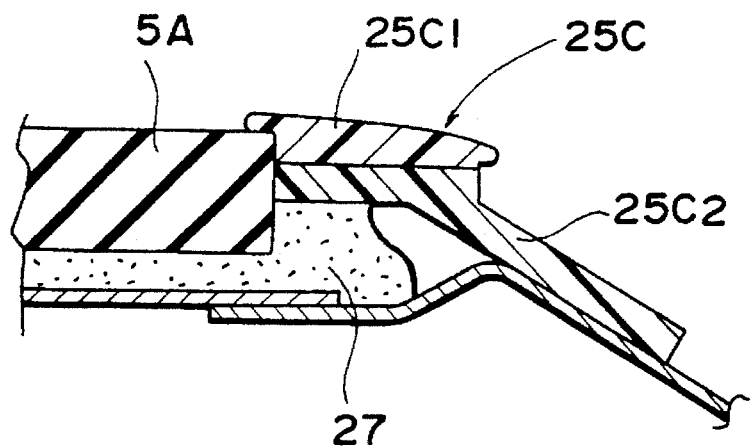
FIG. 28 is a cross sectional view showing a structure of an automobile front windshield corner part as shown in FIG. 25.

On the one hand, as shown in FIG. 25, FIG. 26 and FIG. 28, a corner lacy section 25C has a decorative section 25C1 continuing in the same cross sectional form from said windshield side lacy section 25B and at the same time, on a vehicle body inside surface of said decorative 25C1, an auxiliary lacy body 25C2 for installing a corner section created separately is arranged consecutively to be stuck fast on to a panel side with adhesives 27. The inside peripheral sidewall surface is pressed contiguously against an edge surface of the upper lacy section 5A. Furthermore, this inside peripheral sidewall surface does not have a positive function for fixing the corner lacy section 25C to a panel side, and accordingly its major function is to cover a space in a corner section. Furthermore, in this corner lacy section 25C, a metallic lacy body is not embedded.

Furthermore, as shown in FIG. 25, FIG. 26 and FIG. 29, a roof side lacy section 25A is embedded in a long size groove formed between a side panel 28 and a roof panel 1. On a vehicle body inside surface of a decorative section 25A1, an installation section 25A2 is formed as one united body. This installation section 25A2 has an embedding groove 25A3 having an inverse taper form cross section, and is fixed by embedding this embedding groove 25A3 in a flange form supporting fragment 1C arranged erectly on both sides of the roof panel 1. A molding 25 having these different cross sectional forms in the lengthwise direction and furthermore embedding partially a metallic lacy body in itself has the same function and effect with the molding 5 relating to said first embodiment.

Figure 30:
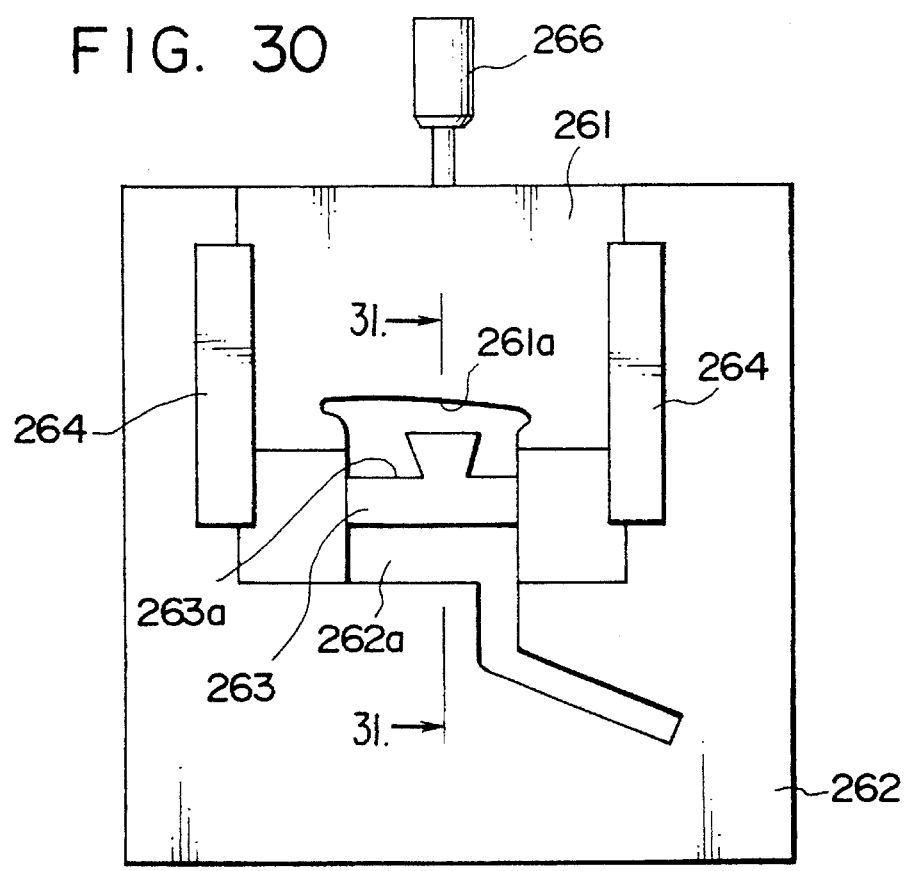
FIG. 30 is an explanatory front view showing an example of an extruding metal mold device used in a manufacturing device to mold a windshield molding in the third embodiment of the present invention.
Figure 31:
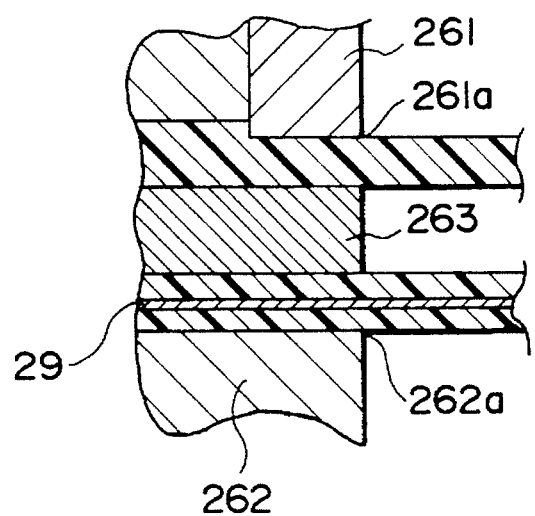
FIG. 31 is a fragmentary longitudinal view taken along line 31—31 as shown in FIG. 30.

A device for manufacturing the molding 25 relating to this third embodiment will be explained. Though the whole device is the same with the one as shown in FIG. 6, as shown in FIG. 30 and FIG. 31, a molding metal mold in this embodiment has the first die 261 and the second die 262 arranged in parallel in the molding extruding direction (vertical direction to the plane) and the third die accommodated inside of an extrusion molding gate compartmented with the first die 261 and the second die 262.

The second die 262 is arranged in a fixed condition, and has an extrusion molding gate 262a. This extrusion molding gate 262a has both an opening section having a contour form corresponding to an installation section of said windshield side lacy section 25B and an opening section having a contour form extending a decorative section in the illustrated upward direction.

Furthermore, said first die 261 and third die 263 are formed respectively from a plate shape member and a box shape member, and whereas the first die 261 is supported on the front surface of the second die 262 so as to be movable in parallel in the direction crossing at right angles to the molding extruding direction with a pair of guide bodies 264 and 364, the third die 263 is supported in the inside of the extrusion molding gate 262a of the first die 261 so as to be movable in parallel in the molding extruding direction with the unillustrated guide body.

An extrusion molding gate 261a arranged in the first die 261 is created by being notched into a contour form corresponding to a part of an installation section continuing to the whole decorative section of the molding 25 and its decorative section, and superposed upon the extrusion molding gate 262a of said second die 262. This first die 261 is constituted so as to perform a reciprocating movement between an unillustrated windshield side lacy section forming position and a roof side lacy section forming position as shown in FIG. 30 with a driving force from a driving motor 266.

Furthermore, in said third die 263, an extrusion molding gate 263a having a contour form corresponding to an installation position of a roof side lacy section 25A is formed by being notched. This third die 263 is constituted so as to perform a reciprocating movement in an unillustrated molding extruding direction with a driving force from a driving motor. This third die 263 is extruded to this side in the front of the extruding direction when said first die 261 is put under the most separate opening condition against the die 262 of said die 2.

In case of performing an extrusion molding on a windshield side lacy section 25B by this structural die, in the first place, the second die 262 and the first die 261 is kept in the most adjacent opening condition. In this side section extruding process, an extrusion molding gate having a certain form corresponding to the windshield side lacy section 25B is compartmented in dies, and by means of this, an extrusion molding of the windshield side lacy section 25B as shown in FIG. 27 is performed. At this time, a metallic lacy body is supplied to a prescribed position within the extrusion molding gate to be extruded together with resin materials as one united body.

Next, in an extruding process to create a corner lacy section 25C, the first die 261 is extruded while moving separately toward the illustrated upward direction against the second die 262. In this varied extruding process, an extrusion molding gate transforming into a form corresponding to the corner lacy section 25C is compartmented in dies, and by means of this, an extrusion molding on the corner lacy section 25C as shown in FIG. 28 is performed. Moreover, extruded moldings corresponding to an installation section are removed as unnecessary parts together with a metallic lacy body 29 as described later.

Furthermore, in case of performing an extrusion molding on the roof side lacy section 25A, in the first place, the first die 261 is kept in the most separate opening condition against the die 262 of the second die 2, and said third die 263 enters an extending area of an extrusion molding gate created at the time from the interior side of the molding extruding direction toward this side in the front. In this divided extruding process, an extrusion molding gate having a certain form corresponding to the roof side lacy section 25A is compartmented in dies, and an extrusion molding on the roof side lacy section 25A is performed and at the same time by the third die 263, an extrusion molding gate corresponding to an installation section of the windshield side lacy section 25B is separated from an extrusion molding gate corresponding to the roof side lacy section 25A so that a divided extrusion is performed. According to this divided extrusion, extruded moldings including the metallic lacy body 29 from an extrusion molding gate corresponding to an installation section of the second die 262 are extruded while being separated from said roof side lacy section 25A.

With regard to a molding material created in this way by an extrusion molding, unnecessary extruded moldings are cut to remove unnecessary parts after being cut uniformly by the cutter 19 as shown in FIG. 6. That is, both extruded moldings corresponding to an installation section extruded by said divided extruding process while being separated from the roof side lacy section 25A and extruded moldings corresponding to an installation section of the corner lacy section 25C are removed as unnecessary parts together with the metallic lacy body 29. Moreover, to the corner lacy section, said auxiliary lacy body 25C2 is added by means of an adhesion or an injection molding.

According to this molding manufacturing method, the molding 25 relating to said embodiment can be molded easily, accurately and furthermore consecutively by a comparatively small size device.

Figure 32:
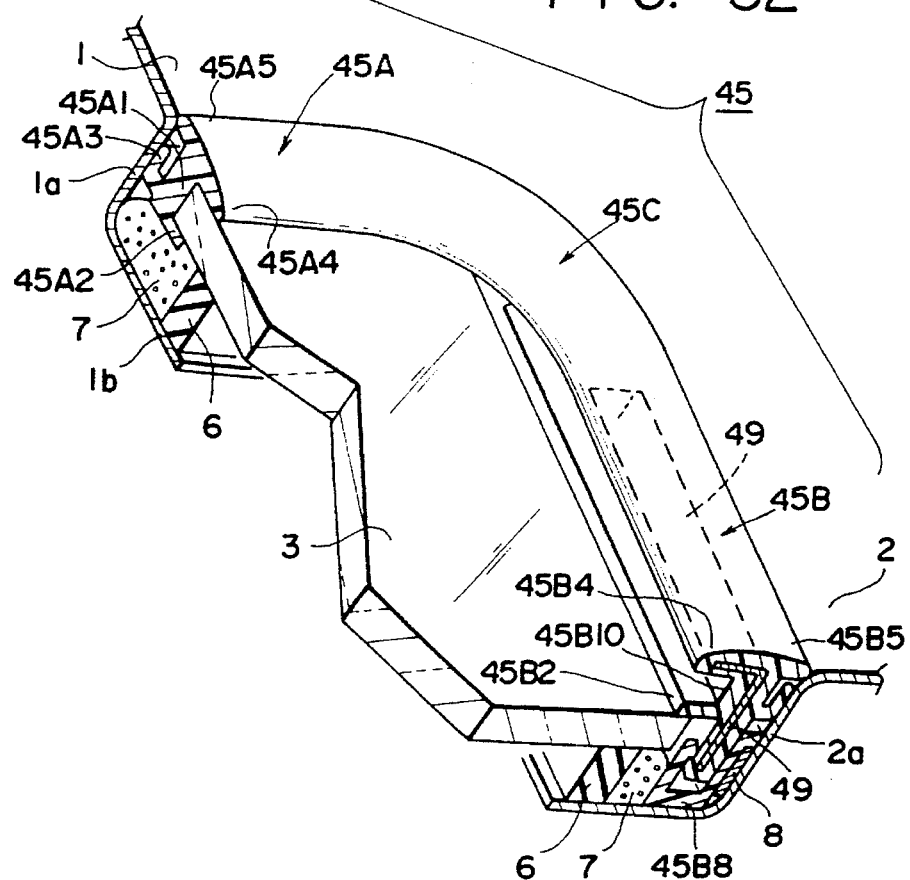
FIG. 32 is a fragmentarily enlarged perspective view showing a structure around a windshield molding corner in the fourth embodiment of the present invention.
Figure 33:
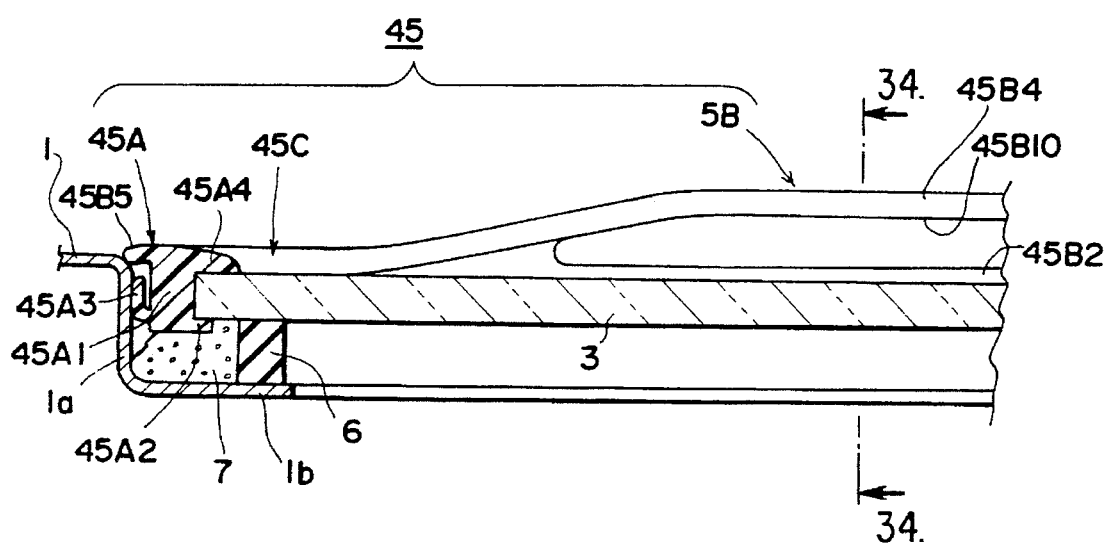
FIG. 33 is a cross sectional view similar to FIG. 2 and showing a structure of a windshield molding in the fourth embodiment of the present invention.
Figure 34:
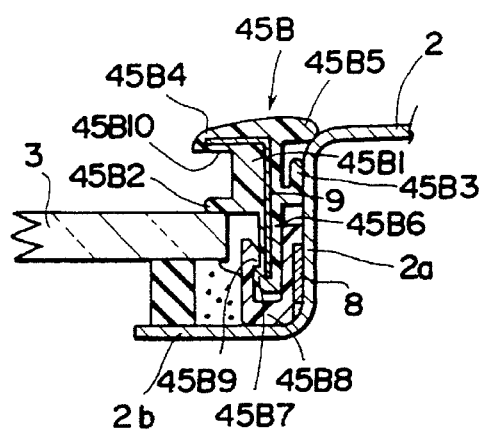
FIG. 34 is a cross sectional view taken along line 34—34 as shown in FIG. 33.

A lacy body in an embodiment as shown in FIG. 32, FIG. 33 and FIG. 34 has an upper lacy section 45A, a corner lacy section 45C and a side lacy section 45B and is installed and arranged from an upper edge of the front windshield 3 through a corner edge to both side edges.

In a vehicle body inside edge section (the lower edge side of FIG. 33) of a strut section 45A1 of an upper lacy section 45A, a pressure welding glass fragment 45A2 is arranged and at the same time in a vehicle body inside edge section, an elastic lip 45A3 projecting toward the opposite side of the projecting direction of the pressure welding glass fragment 45A2, that is, toward a vehicle body inside bending section is formed. This elastic lip 45A3 is pressed consecutively against a vehicle body inside bending section 1a by being bent approximately in an L shape. Furthermore, on a vehicle body outside edge (the upper edge side of FIG. 33), a lip form glass side decorative section 45A4 diverging from said strut section 45A1 and a panel side decorative section 45A5 are arranged consecutively.

Next, a side lacy section 45B continues from the pillar upper side toward its lower side through the corner lacy section 45C by starting from said upper lacy section 45A, and its cross sectional structure is shown in FIG. 32 and FIG. 34. On the lower edge of FIG. 34 of the strut section 45B1 of the side lacy section 45B, a pressure welding glass fragment 45B2 is arranged and at the same time an elastic lip 45B3 is arranged so as to project toward a vehicle body inside bending section 2a on the opposite side of the projecting direction of this pressure welding glass fragment 45B2.

Furthermore, on the lower side of FIG. 34 of said strut section, a strut leg 45B6 extending said strut section 45B1 in a long and narrow form toward a vehicle body 45B1 is arranged. In the tip part (the lower edge part of FIG. 34) of this strut leg section 45B6, a connecting and fixing fragment 45B7 arranged in a hooked shape is embedded and stuck fast in a fastener 45B8. The fastener 45B8 is stuck fast on to an inside wall of a vehicle body inside bending section 2a through a double side adhesive tape 8. In the upper side opening edge section of the fastener 45B8, a connection fixing fragment 45B9 is formed, and the connecting and fixing fragment 45B7 of said strut leg section 45B6 inserted into said fastener 45B8 is embedded in said connection fixing fragment 45B9 so that the side lacy section 45B can be fixed.

Furthermore, on a vehicle body outside edge (the upper edge side of FIG. 34) of said strut section 45B1, a glass side decorative section 45B4 and a panel side decorative section 45B5 created in lip shapes are arranged consecutively so as to diverge from the strut section 45B1. The glass side decorative section 45B4 is opposed approximately in parallel at regular intervals toward said pressure welding glass fragment 45B2 and a vehicle body outside direction, and between this glass side decorative section 45B4 and the pressure welding glass fragment 45B2, a rainwater drain channel 45B10 is formed consecutively from the side lacy section 45B to the middle part of the corner lacy section 45C along its glass edge and disappears approximately in the middle of the corner section.

Furthermore, in the side lacy section 45B, an approximately L shape cross sectional form insert core material 49 is embedded from the glass side decorative section 45B4 to the strut section 45B1 and the strut leg section 45B6. This insert core material 49 is embedded only in the side section but not arranged in said upper lacy section 45A and the corner lacy section 45C.

Figure 35:
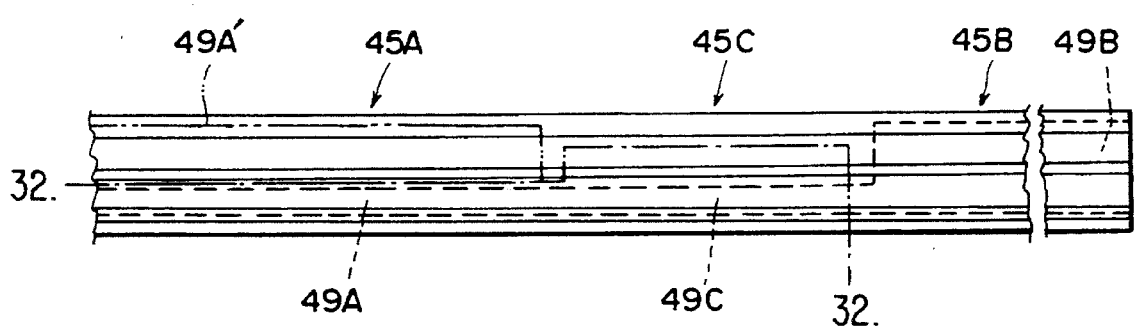
FIG. 35 is an explanatory side view showing a condition directly after an extrusion molding on a windshield molding as shown in FIG. 32.
Figure 36:
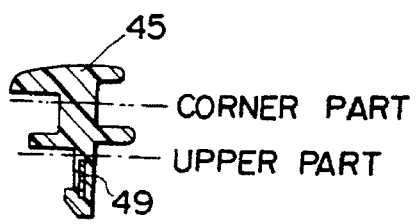
FIG. 36 is a sectional view showing a cross sectional form of a windshield molding.

Next, in addition to explaining a molding manufacturing method, a structure of the corner lacy section 45C will be explained. In the first place, as shown in FIG. 35 and FIG. 36, a molding in this embodiment is cut along line Y—Y with regard to a part corresponding respectively to the upper lacy section 45A and the corner lacy section 45C, after performing an extrusion molding consecutively so that said side lacy section 45B can be created in a uniform cross sectional form. That is, in the upper lacy section 45A, a cut is performed at a position as shown by a dashed line in FIG. 36, and in the corner lacy section 45C, a cut is performed at a position as shown by a two-dot chain line in FIG. 36.

Figure 37:
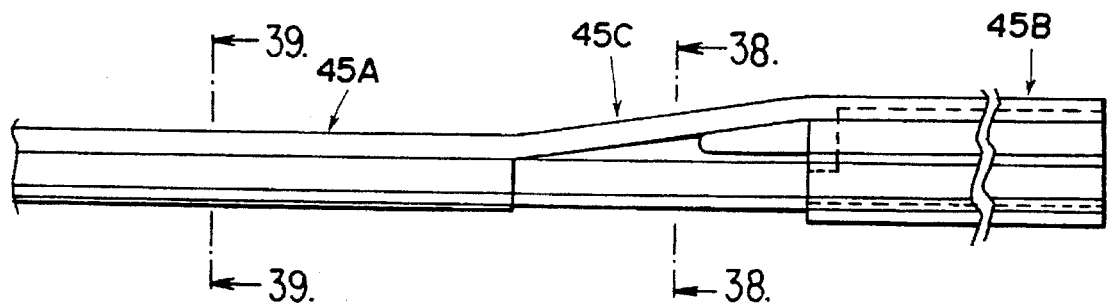
FIG. 37 is an explanatory side view showing a windshield molding after a cut is performed.
Figure 38:
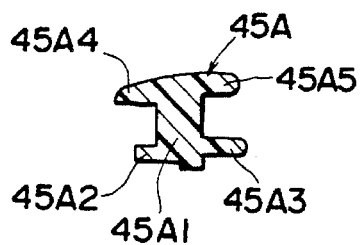
FIG. 38 is a cross sectional view taken along line 38—38 as shown in FIG. 37.
Figure 39:
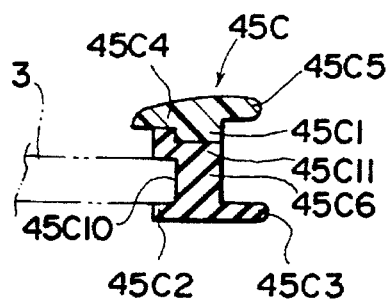
FIG. 39 is a cross sectional view taken along line 39—39 as shown in FIG. 37.
Figure 40:
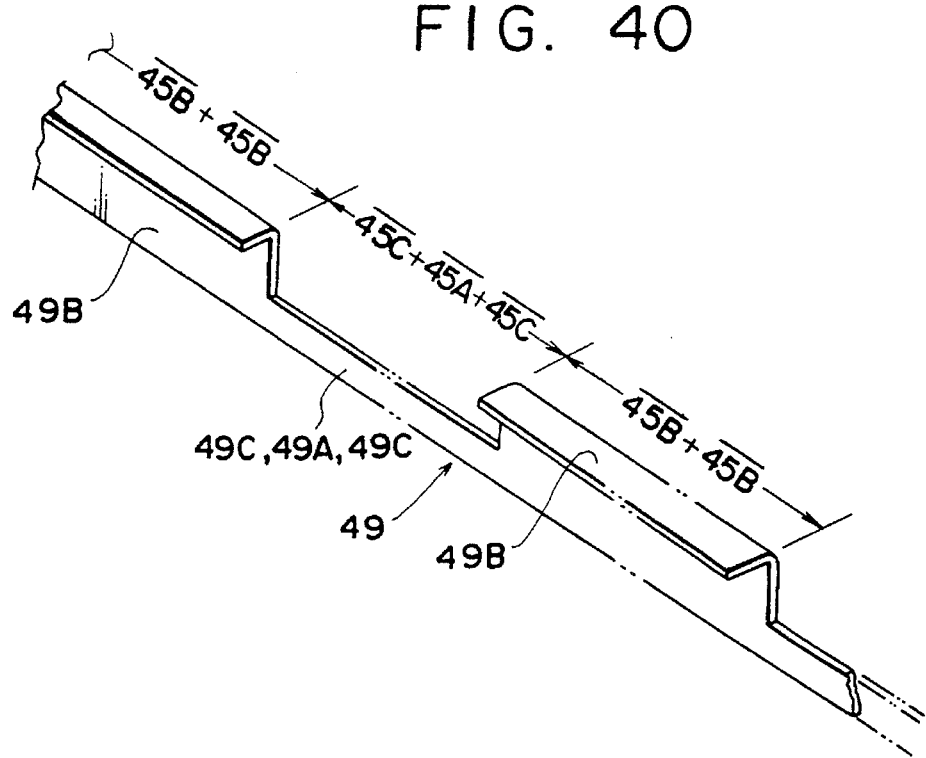
FIG. 40 is a perspective view showing a metallic core material form used for a windshield molding in the present invention.
Figure 41:
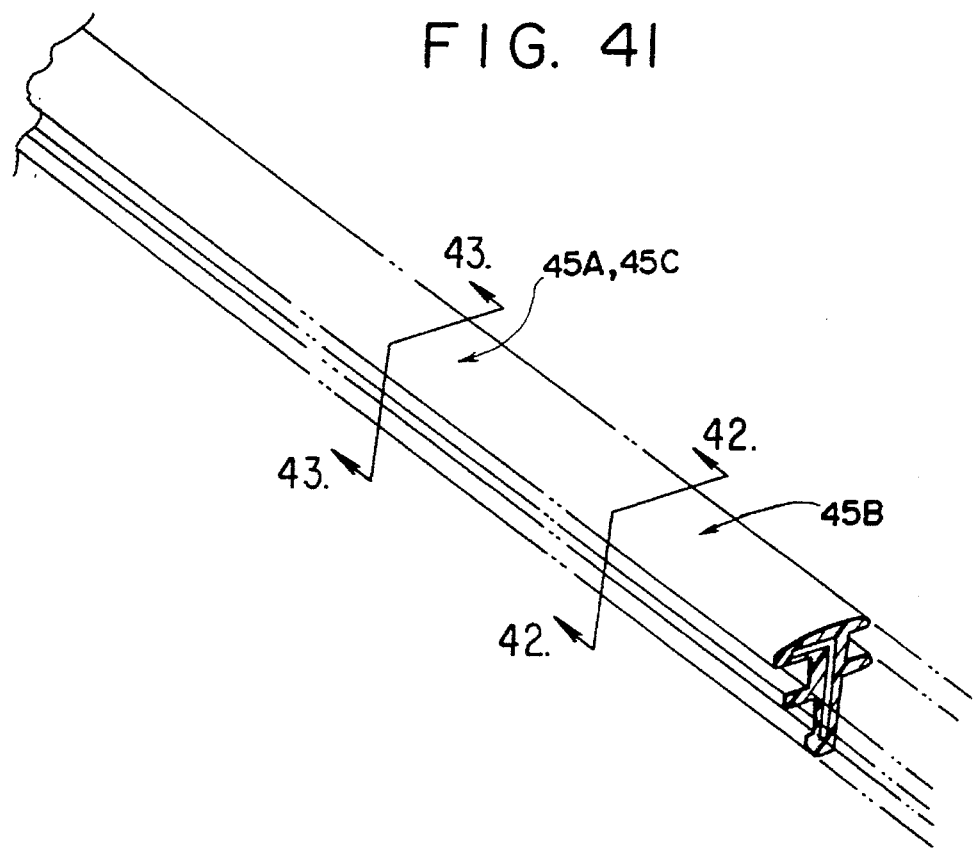
FIG. 41 is a perspective view showing a condition directly after an extrusion molding on a windshield molding as shown in FIG. 32.
Figure 42:
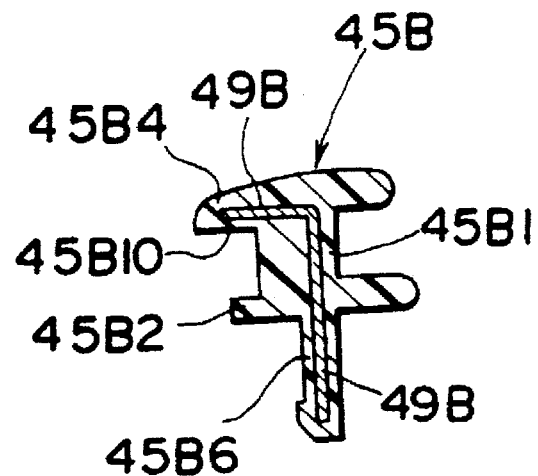
FIG. 42 is a cross sectional view taken along line 42—42 as shown in FIG. 41.
Figure 43:
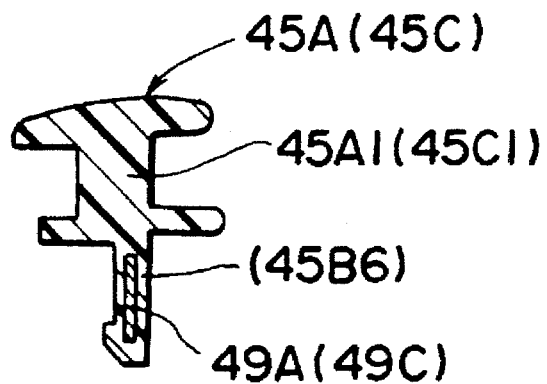
FIG. 43 is a cross sectional view taken along line 43—43 as shown in FIG. 41.

At this time, said insert core material 49 is formed in advance in a form as shown in FIG. 40. That is, this insert core material is the one to be embedded only in the side section as described above, and is molded in an L shape cross sectional form at a part 49B corresponding to the side section. And as shown in FIG. 42, the insert core material 49B is embedded from the glass side decorative section 45B4 to the strut section 45B1 and the strut leg section 45B6. Furthermore, at parts 49A and 49C corresponding to the upper section and the corner section, it is molded in a long and narrow plate form, and embedded only in a part corresponding to the strut leg section 45B6 of said side section as shown in FIG. 43. A part corresponding to the strut leg section 45B6 in this upper section and the corner section is removed finally from a molding after being cut as described above. Accordingly, as shown in FIG. 37 and FIG. 39, the insert core material 49 is not arranged in the upper lacy section 45A and the corner lacy section 45C.

That is, as shown in FIG. 39, the corner lacy section 45C has both a glass side decorative section 45C4 and a vehicle body panel side decorative section 45C5 obtained by a cut as shown by a two-dot line in said FIG. 36 and a part of the strut section 45C1 connecting these both decorative sections. Furthermore, to the illustrated lower edge section of said strut section 45C1, a pillar form auxiliary lacy body 45C6 is connected as one united body by an injection molding. On the sidewall of this auxiliary lacy body 45C6, a concave groove 45C10 to receive a corner edge section of the front windshield 3 is formed and at the same time on the illustrated upper side of that concave groove 45C10 forming part, a supporting section 45C11 is arranged. This supporting section 45C11 is set such that its molded height in the illustrated vertical direction is raised gradually (see FIG. 33 and FIG. 37) from the upper side to its side so as to continue a molding from the upper section to the side section. A molded height change in this supporting section 45C11 is set to correspond to a height difference change between a vehicle body panel and a windshield.

Figure 49:
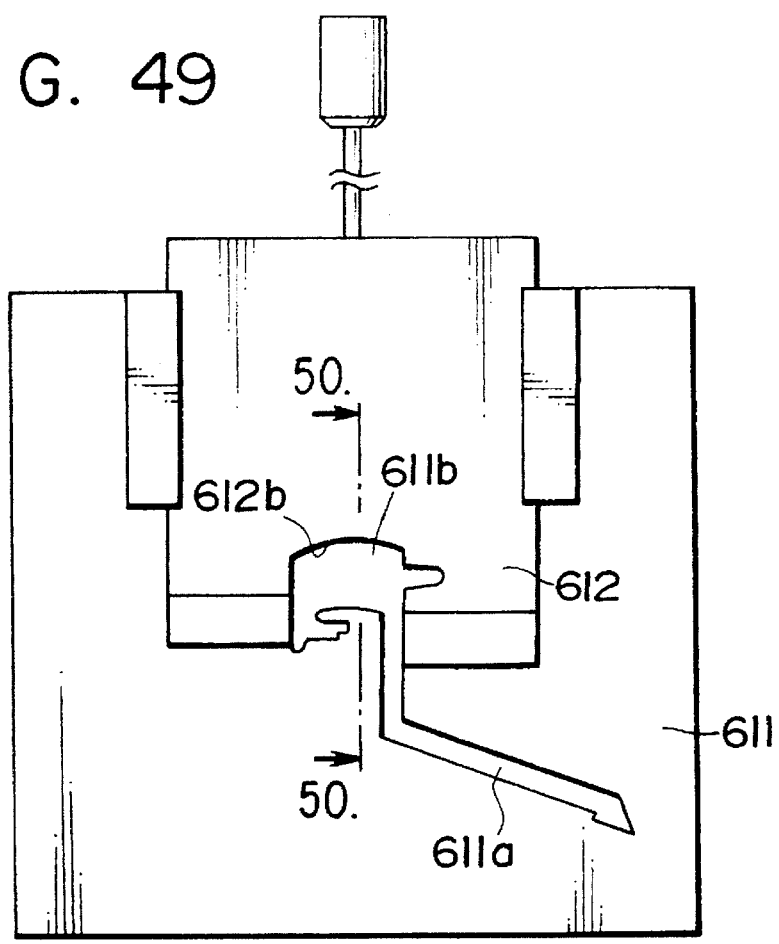
FIG. 49 is an explanatory front view showing a moving condition of an extruding metal mold device die as shown in FIG. 47.
Figure 50:
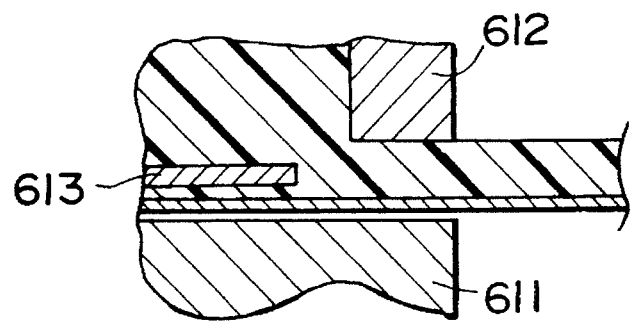
FIG. 50 is an enlarged cross sectional view taken along line 50—50 as shown in FIG. 49.

Moreover, with regard to the insert core material 49 in this embodiment, as shown in FIG. 49 and FIG. 40, the length of a part 49B corresponding to the side section is set to be twice as long as the length of the side lacy section 45B and at the same time between the fellow parts 49B and 49B corresponding to these side sections, a part 49A corresponding to a single upper lacy section 49A and parts 49C and 49C corresponding to a pair of corner lacy sections 45C and 45C are employed with a part 49A corresponding to this upper lacy section 45A between. With regard to a molding after an extrusion molding as a whole, a cut is performed so that a pair of corner moldings 45C and 45C and side moldings 45B and 45B can be constituted with a single upper molding 45A between.

In this way, according to this embodiment, by the insert core material 49 embedded in the side lacy section 45B having a rainwater drain channel, an intensity of said side lacy section 45B is raised so that especially the glass side decorative 45B4 forming the rainwater drain channel can be reinforced. Furthermore, since the insert core material 49 is not arranged in the upper lacy section 45A and the corner lacy section 45C other than the side lacy section 45B, an elastically bending strength in these parts is maintained, and accordingly in case of installing and storing a molding, a prescribed operation can be performed efficiently while bending the upper lacy section 5A and the corner section 45C.

Furthermore, as shown by a two-dot chain line in FIG. 35, in an embodiment setting the part 49A corresponding to the upper lacy section 45A in the same form with the part 49B corresponding to the side section, the insert core material 49 is arranged in both the side lacy section 45B and the upper lacy section 45A but the insert core material is not arranged only in the corner lacy section 45C. In this embodiment, the same function and effect with the above-described embodiment can be obtained.

Figure 44:
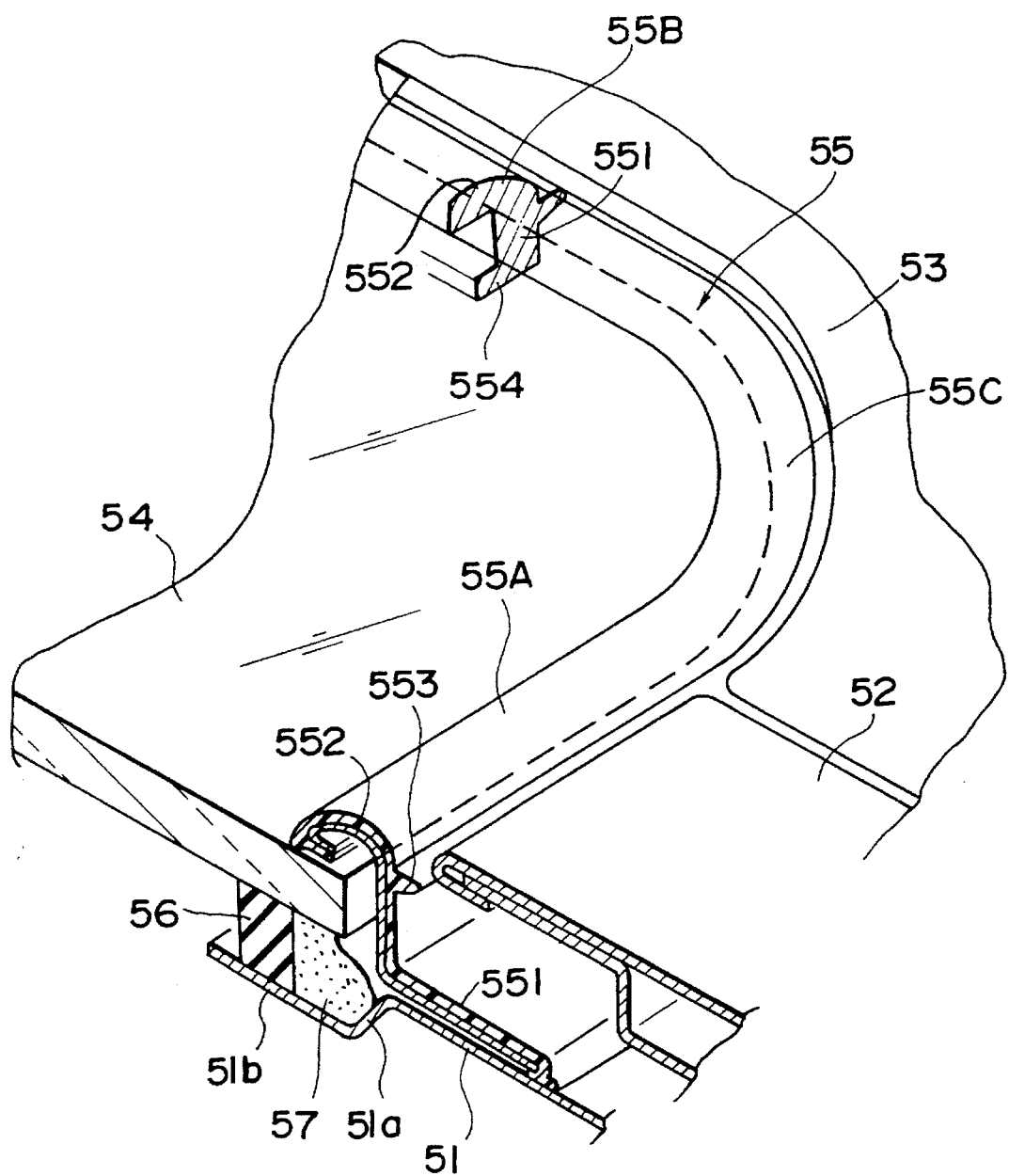
FIG. 44 is a fragmentarily enlarged perspective view showing a structure around a corner section of an automobile rear windshield molding as shown in FIG. 44.
Figure 45:
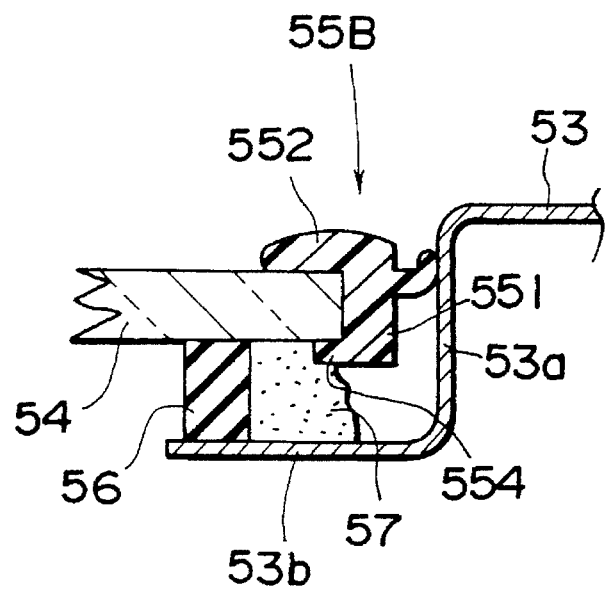
FIG. 45 is a cross sectional view showing a structure of a side section of an automobile rear windshield molding as shown in FIG. 44.
Figure 46:
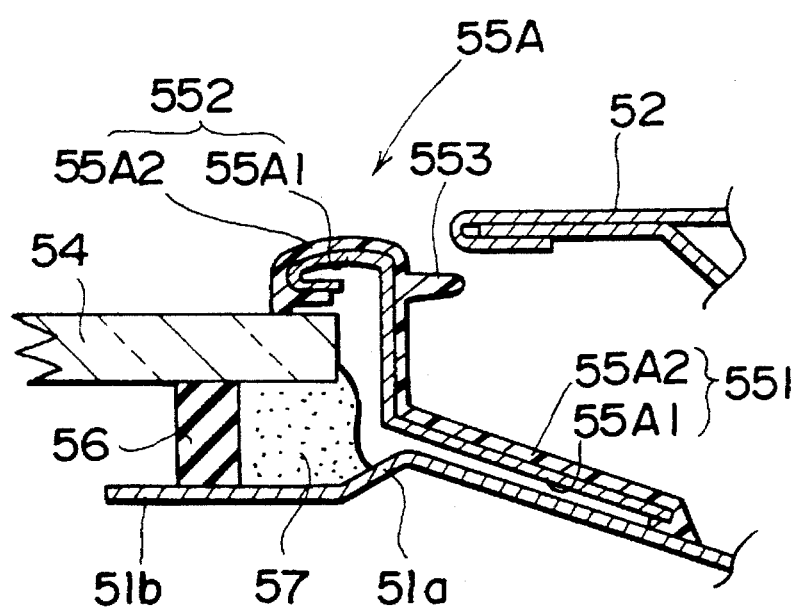
FIG. 46 is a cross sectional view showing a structure of an under section of an automobile rear windshield molding as shown in FIG. 44.

An embodiment as shown in FIG. 44, FIG. 45 and FIG. 46 is the one applying the present invention to a rear molding, and as if covering over the upper section of a rear body panel 51, a trunk lid panel 52 is installed so as to be capable of opening and closing freely and at the same time from both edges of these rear body panel 51 and trunk lid panel 52 and an edge of a rear side pillar panel 53, a rear window frame opening section is formed. To the inside peripheral section of this rear window frame opening section, a rear windshield 54 is stuck fast from a vehicle body outside, and between the periphery of this rear windshield 54 and the inside peripheral section of the rear window frame opening section of said vehicle body panels 51, 52 and 53, a long and narrow space is formed consecutively. To cover this long and narrow space, a long size rear windshield molding 55 is installed.

The rear windshield molding has an under molding 55A installed along the lower edge of the rear windshield 54, a side molding 55B installed along the side edge of the rear windshield 54 and a corner molding 55C connecting curvedly these under molding 55A and side molding 55B consecutively as one united body.

In an installation structure of this rear windshield molding, in the first place, each edge section of the rear body panel 51 and the rear side pillar panel 53 is bent respectively toward a vehicle body inside (illustrated lower side) so as to become hollow in a stairs form, and flange sections 51b and 53b are arranged extendedly toward the rear windshield 54 side through each of those vehicle body inside bending sections 51a and 53a. On a vehicle body outside surface (the upper side surface of FIG. 46 and FIG. 45) of said flange sections 51b and 53b, said rear windshield 54 is superposed through a dam rubber 56. The lower edge of this rear windshield 54 is arranged so as to be opposed at regular intervals to the edge section of said trunk lid panel 52 and a vehicle body inside bending section 53a of the rear side pillar panel, and in a space compartmented with the rear windshield 54, the dam rubber 56, the body panel flange sections 51b and 53b and the vehicle body inside bending sections 51a and 53a, adhesives 57 for sticking said each member are filled up.

On the one hand, each of said moldings 55A, 55B and 55C has both an installation section 551 to maintain a molding and a decorative section 552 to cover said space from a vehicle body outside by being supported with this installation section 551. Among them, the under molding 55A is constituted by covering an elastic lacy body 55A2 consisting of rubber or resin materials over a metallic core material 55A1 and at the same time both the side molding 55B and the corner molding 55C consist only of an elastic lacy body without including a metallic core material. A structure of each section will be explained hereinafter.

In the first place, in the installation section 551 of the under molding 55A, the metallic core material 55A1 constituting a base of said installation section 551 is arranged as if going along the vehicle body outside surface of the rear body panel 51 and at the same time the base of its installation section is fixed firmly to rear body panel 51 with a fixing member such as an unillustrated clip or bolt. Furthermore, the base of this installation section 551 is bent from a part corresponding to the vehicle body inside bending section 51a of the rear body panel toward a vehicle body outside (the illustrated upper side), and both the metallic core material 55A1 and the elastic lacy body 55A2 constituting its bending section extend toward a vehicle body outside (the illustrated upper side) in a space between an edge of the rear windshield 54 and an edge of the trunk lid panel 52.

On the one hand, the decorative section 552 of the under molding 55A is molded in an oblate hollow form, and arranged so as to extend from a vehicle body outside edge (the upper side) of said installation section 551 to a vehicle body outside surface of the rear windshield 54. The vehicle body outside surface of this decorative section 552 is formed in a convex surface like projecting curvedly toward a vehicle body outside. Furthermore, in the inside peripheral part (the illustrated left side part) of this decorative section 552, the metallic core material 55A1 is bent approximately in a U shape and at the same time the inside peripheral edge (the illustrated lower edge) of a vehicle body inside of the elastic lacy body 55A2 is pressed contiguously against a vehicle body outside surface of the rear windshield 54. Furthermore, in the outside peripheral part (the illustrated right side part) of this decorative section 552, an elastic lip fragment 553A is arranged so as to project toward the trunk lid panel 52 side.

Next, since the side molding 55B and the corner molding 55C are constituted only from an elastic lacy body such as rubber or resin materials as described above, a metallic core material is not arranged. The installation section in the side molding 55B and the corner molding 55C is created approximately in an L shape cross sectional form and at the same time the decorative section 552 is constituted so as to extend from a vehicle body outside edge section of said installation section 551 to a vehicle body outside surface of the rear windshield 54. In the inside periphery of a vehicle body inside edge (the illustrated lower edge) of said installation section 551, a glass connecting and fixing fragment 554 is arranged projecting-like so as to be contiguously against a vehicle body inside surface (the illustrated lower side) of the rear windshield 54, and in a groove compartmented approximately in a ⌐shape between this glass connecting and fixing fragment 554 and the decorative section 552, the edge section of the rear windshield 54 is embedded.

Furthermore, though the decorative section 552 in the side molding 55B and the corner molding 55C is approximately in the same external form with the decorative section 552 in said under molding 55A, what differs from the others is the fact that it is created in a hollow body of rubber or resin materials. At the outside peripheral part (the illustrated right side part) of this decorative section, the elastic lip fragment 553 similar to said under molding 55A is arranged projecting-like, and the tip section of this elastic lip fragment 553 is pressed contiguously so as to be bent in an L shape against the vehicle body inside bending section 3a surface of the side pillar panel 53. A bending resiliency of this elastic lip fragment 553 acts as a pressing and fixing force for pressing the side molding 55B and the corner molding 55C against the rear windshield 54 side.

In case of installing the rear windshield molding 55 relating to an embodiment like this, after having embedded an overall length of said rear windshield molding in a prescribed position, the installation section 551 of the under molding 55A is fixed firmly to the rear body panel 51 side with fixing members such as unillustrated clips or bolts. A basic operation is completed with this. That is, a molding can be installed without fixing some other conventional separate members. Furthermore, since the rear windshield molding 55 after being installed continues sequentially as one united body through an overall length of the decorative section 552, an excellent design quality can be obtained.

Figure 47:
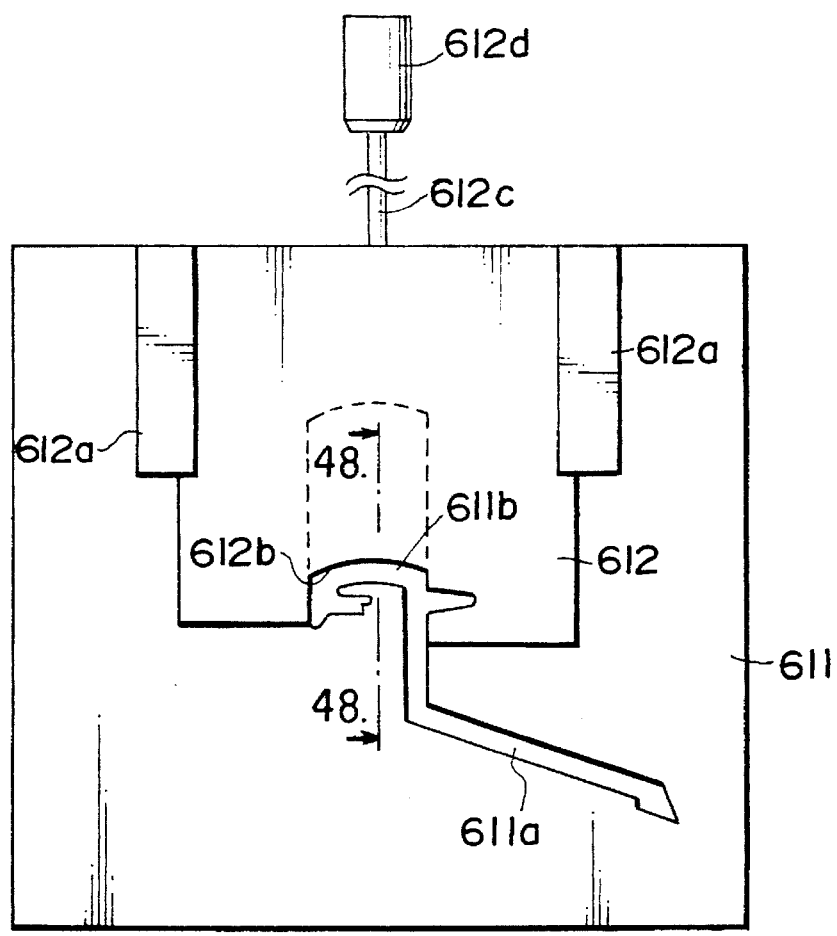
FIG. 47 is an explanatory front view showing an example of an extruding metal mold die to mold a rear windshield molding in the present invention.
Figure 48:
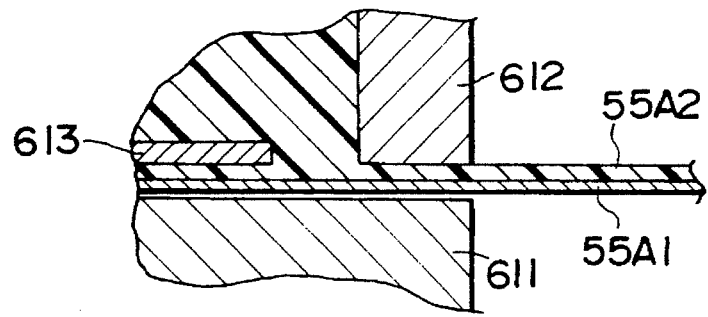
FIG. 48 is an enlarged cross sectional view taken along line 48—48 as shown in FIG. 47.

A manufacturing device for this automobile rear windshield molding 55 will be explained hereinafter. A molding metal mold arranged in an extrusion molding device, for example, as shown in FIG. 47 or FIG. 48, has the second die 511 and the first die 612 arranged in parallel toward the molding extruding direction (vertical direction to the plane) and the third die 613 arranged inside of an extrusion molding gate compartmented with the second die 611 and the first die 612. The second die 611 is arranged in a fixed condition, and has an extrusion molding gate having a form corresponding to a contour form of the rear windshield molding. An extrusion molding gate of this second die 611 is constituted in a large size opening form so as to include an opening part 611a creating a contour form corresponding to the installation section 551 of said under molding 55A and an opening part 611b creating a contour form extending the decorative section to the illustrated upward direction as shown by a dashed line in FIG. 4. The opening part 611b is constituted in a large size opening form so as to include the decorative section capable of covering an overall length of the rear windshield molding and the installation section 551 in the side molding 55B and the corner molding 55C.

On the one hand, said first die 612 is supported on the front surface of said second die 611 so as to be movable in parallel toward the direction crossing at right angles to the molding extruding direction with a pair of guide bodies 612a and 612a. On the other hand, the third die 613 is supported in an extrusion molding gate 611b of said second die 611 so as to be movable in parallel toward the molding extruding direction with unillustrated guide bodies.

Figure 51:
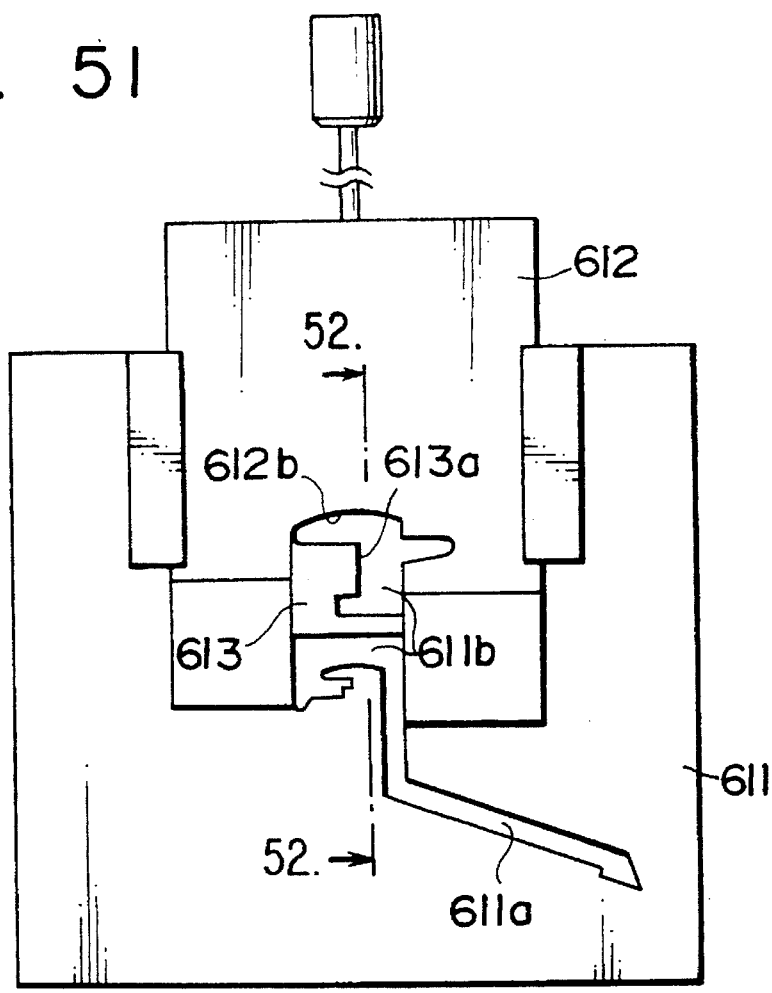
FIG. 51 is an explanatory front view showing another moving condition of an extruding metal mold device die as shown in FIG. 47.
Figure 52:
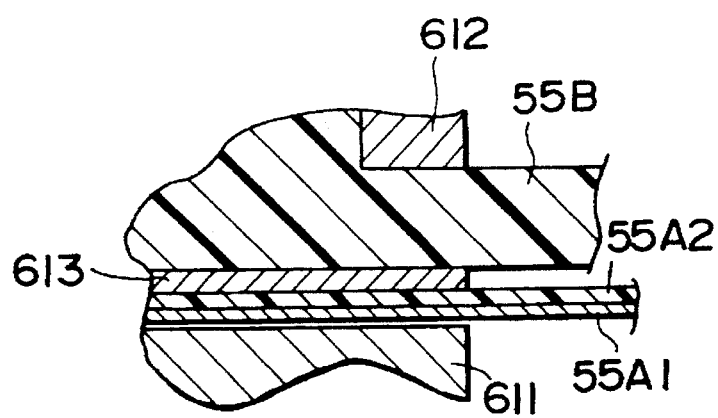
FIG. 52 is an enlarged cross sectional view taken along line 52—52 as shown in FIG. 51.
Figure 53:
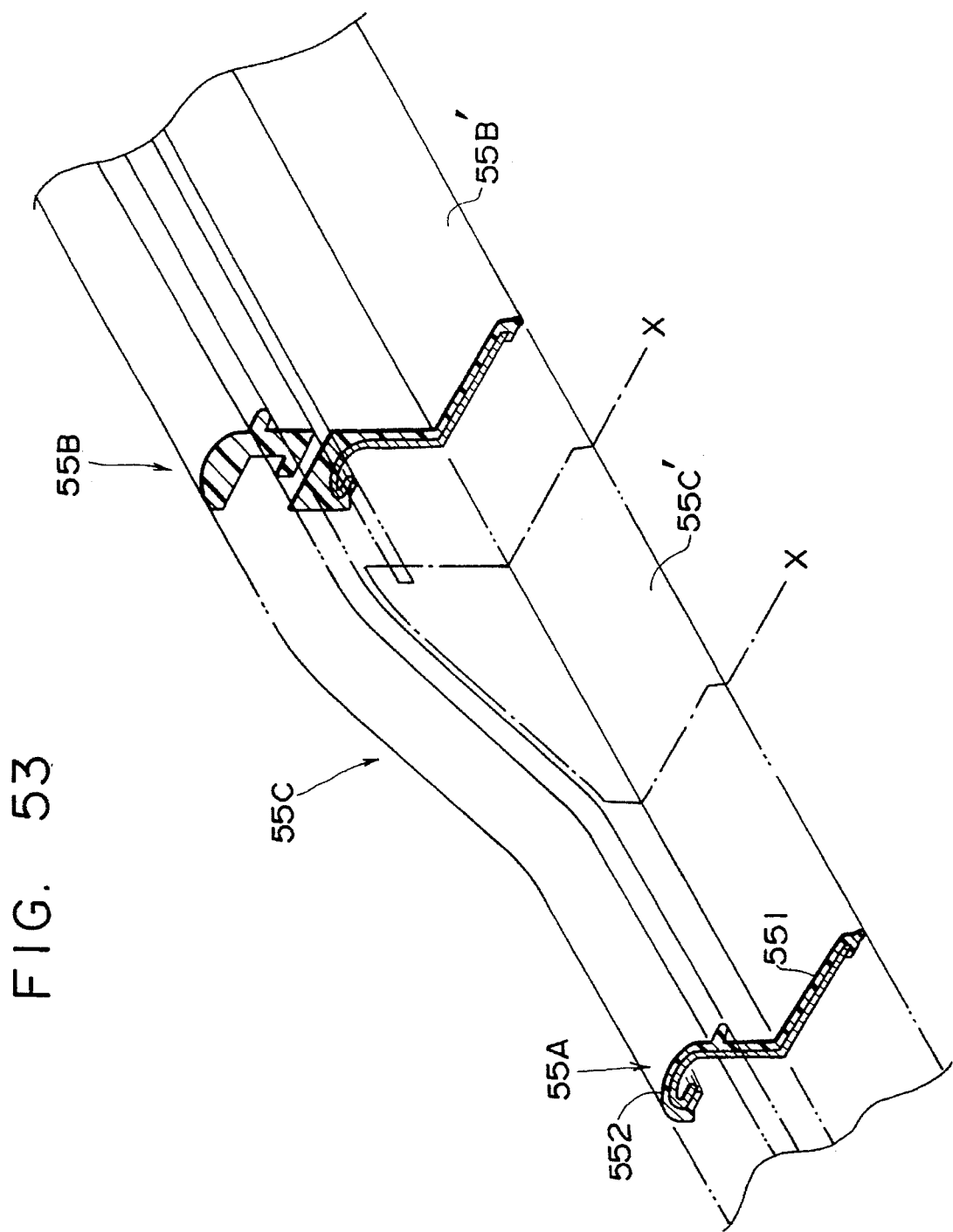
FIG. 53 is a perspective view showing a rear windshield molding directly after an extrusion molding.
Figure 54:
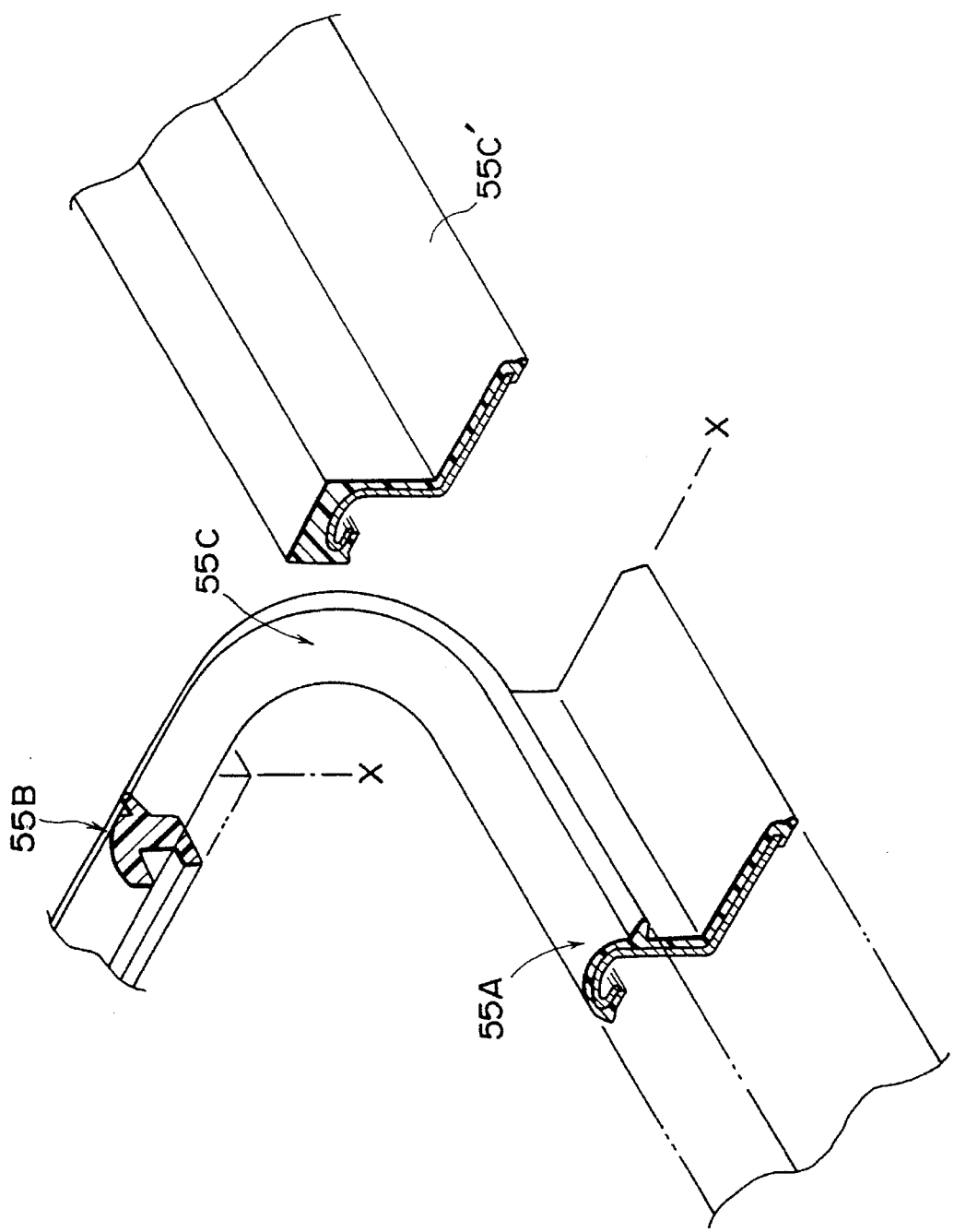
FIG. 54 is a perspective view showing a condition that unnecessary parts of a rear windshield molding after an extrusion molding are removed.

In the illustrated lower edge section of said die 612, an extrusion molding gate 612b (a compartmenting fragment) notched into a circular arc form corresponding to a vehicle body outside surface form of the decorative section 552 is arranged. This extrusion molding gate 612b is superposed so as to cover part of an extrusion molding gate 611b of said second die 611, and with that, an extrusion molding gate corresponding to the decorative section 552 is compartmented. Furthermore, in the illustrated upper edge section of this first die 612, a connecting bar 612c is installed, and this connecting bar 612c is connected to a driving motor 12d through an unillustrated converter so as to convert a rotary motion into a rectilinear motion. With a driving force from the driving motor 12d, the first die 612 is separated from or drawn near toward the direction crossing at right angles to the extruding direction against an extrusion molding gate of the second die 611 so that an extrusion molding gate compartmented with said first die 612 and second die 611 can be extended or shortened. To put it more concretely, between an under molding forming position as shown in FIG. 47, a corner molding forming position as shown in FIG. 49 and a side molding forming position as shown in FIG. 51, a reciprocating movement can be performed.

Furthermore, especially as shown in FIG. 48, FIG. 50, FIG. 51 and FIG. 52, said third die 613 has a function that it enters an extrusion molding gate compartmented with both said second die 611 and first die 612 form the interior side of the extruding direction to divide said extrusion molding gate so that different form extrusion molding gates can be compartmented. On the tip section of this third die 613, an extrusion molding gate 613a having a contour form corresponding to the inside peripheral side surface form of the side molding 55B is formed, and this extrusion molding gate is constituted so as to perform a reciprocating movement toward the molding extruding direction with a driving force of the unillustrated driving motor. This third die 613 is extruded toward this side in the front of the extruding direction when the first die 612 is put under the most separated opening condition against said second die 611 as described later.

Each process using a molding metal mold of such extruding metal mold device, such as an extruding basic process to mold the under molding 54A of the rear windshield molding 55, a variation extruding process to mold the corner molding 55C, a divided extrusion molding process to mold the side molding 55B and a cutting process to remove unnecessary extruded molding parts is the same with those in said embodiments, and so an explanation will be omitted.

Figure 55:
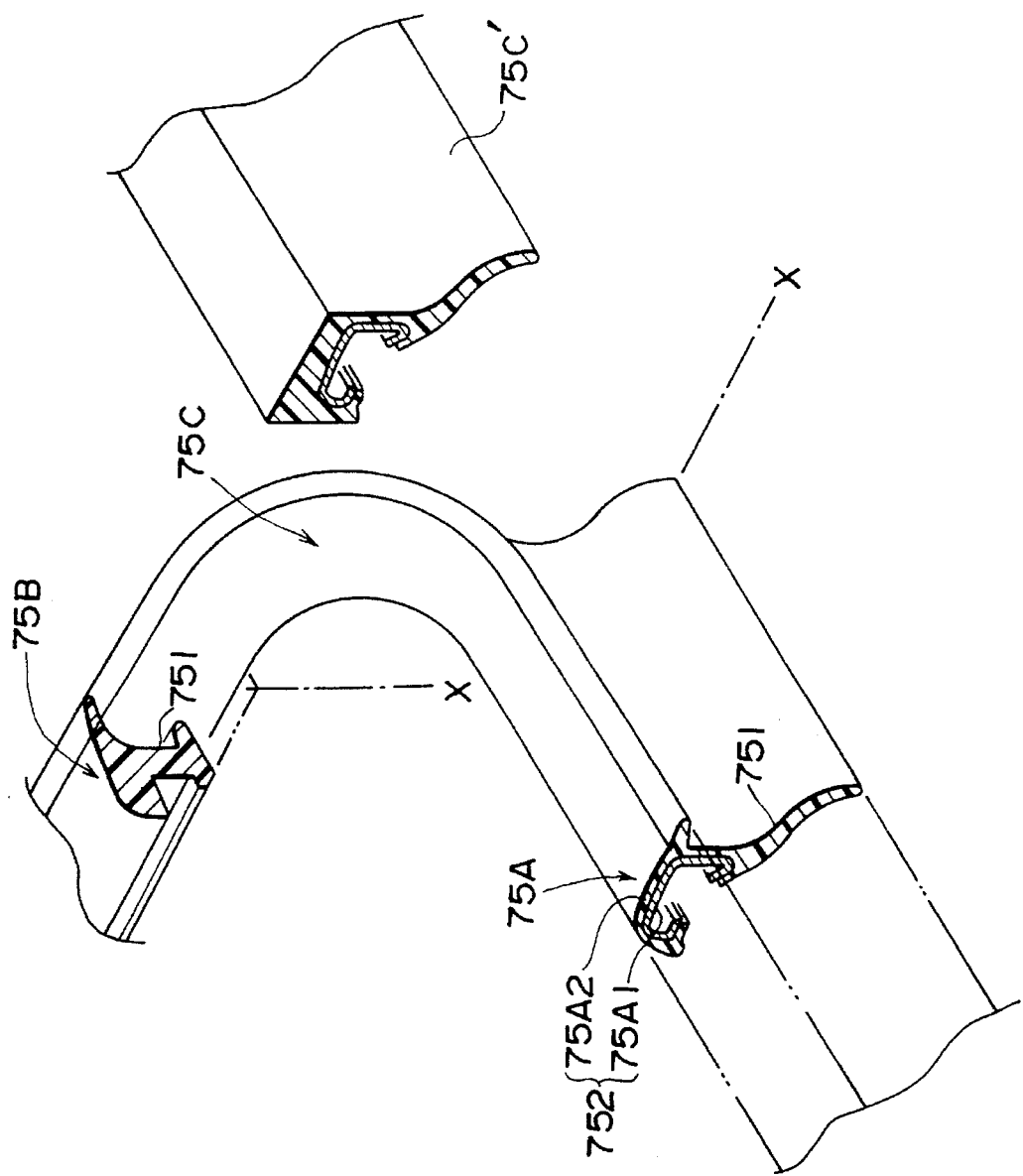
FIG. 55 is a perspective view showing a condition that unnecessary parts are removed from a rear windshield molding created by an extrusion molding according to another embodiment of the present invention.

The rear windshield molding 75 relating to an embodiment as shown in FIG. 55 has also the under molding 75A installed along the lower line of the rear windshield, the side molding 75B installed along the side edge of the rear windshield 74 and the corner molding 75C connecting curvedly the under molding 75A and the side molding 75B consecutively as one united body. Each of said moldings 75A, 75B and 75C has both the installation section 751 to keep the molding and the decorative section 752 supported with this installation section 751. The decorative section 752 in the under molding 75A is constituted so as to cover an elastic lacy body 75A2 consisting of rubber or resin materials over a metallic lacy body 75A1 and at the same time the installation section 751 in this under molding 75A is constituted by extending an elastic lacy body without including a metallic lacy body to a vehicle body panel side. On the one hand, the whole of both the side molding 75B and the corner molding 75C consist only of an elastic lacy body without including metallic core materials.

Figure 56:
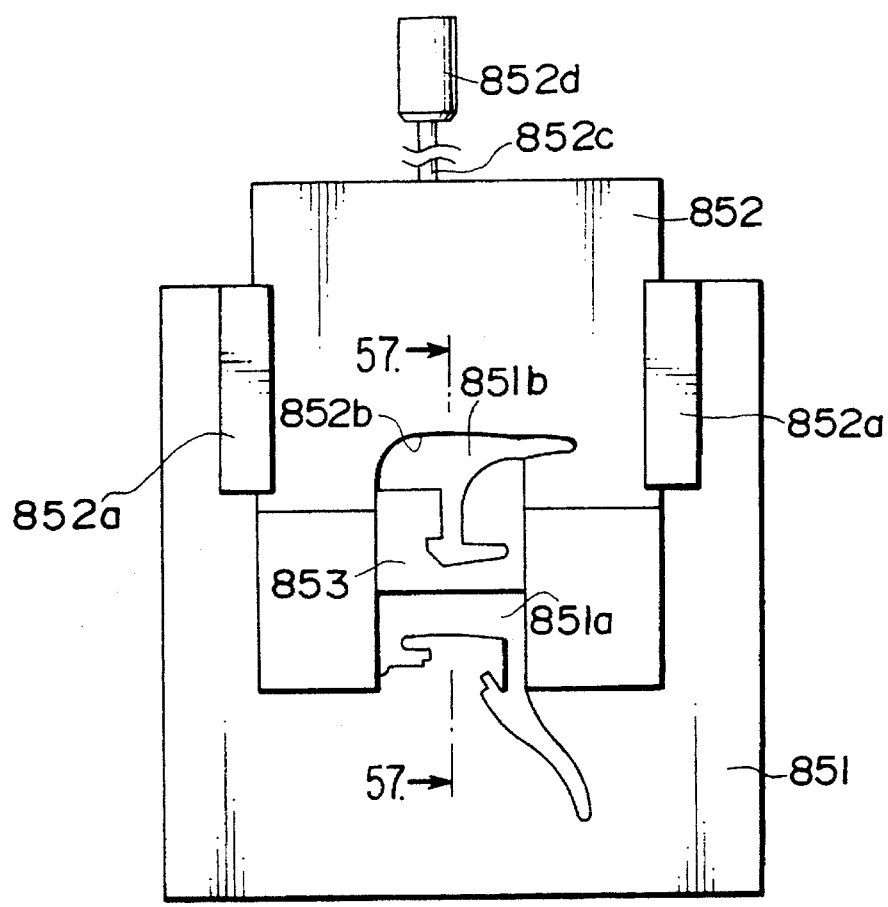
FIG. 56 is an explanatory front view showing an example of an extruding metal mold die to mold a rear windshield molding as shown in FIG. 55.
Figure 57:
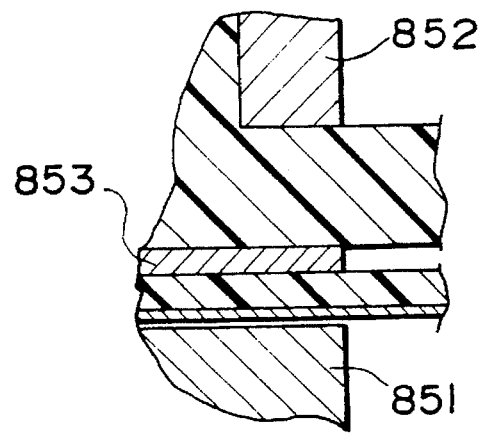
FIG. 57 is an enlarged cross sectional view taken along line 57—57 as shown in FIG. 56.

A manufacturing device for this automobile rear windshield molding 75 will be explained hereinafter. A molding metal mold arranged in an extruding metal mold device, as shown in FIG. 56 and FIG. 57, has both the second die 851 and the first die 852 arranged in parallel toward the molding extruding direction (vertical direction to the plane) and the third die 853 arranged inside of an extrusion molding gate compartmented with the first die 851 and the second die 852. The second die 851 is arranged in a fixed condition, and has an extrusion molding gate having a contour form corresponding to the outer peripheral side surface of the rear windshield molding 75. This extrusion molding gate has a large size contour form created by uniting both an opening part 851a having a contour form corresponding to said under molding 75A and an opening part 851b having a contour form corresponding to both the side molding 75B and the corner molding 75C in one body.

The first die 852 and third die 853 are created respectively from a plate form member and a box form member. Among them, the first die 852 is supported on the front surface of the second die 851 so as to be movable in parallel toward the direction crossing at right angles to the molding extruding direction with a pair of guide bodies 852a and 852a. On the other hand, the third die 853 is supported in the extrusion molding gate of said second die 851 so as to be movable in parallel toward the molding extruding direction with unillustrated guide bodies.

In the illustrated lower edge section of said first die 852, an extrusion molding gate 852b consisting of a circular arc form compartmenting fragment corresponding to a vehicle body outside surface of the decorative section 752 is created by being notched. This extrusion molding gate 852b is superposed so as to cover a part of the extrusion molding gate of said second die 851, and an extrusion molding gate corresponding to the decorative section 752 is compartmented. Furthermore, in the illustrated upper edge section of this first die 852, a connecting bar 852c is arranged, and this connecting bar 852c is connected to a driving motor 852d through an unillustrated converter so as to convert a rotary motion into a rectilinear motion. With a driving force form this driving motor 852d, said first die 852 is set to perform a reciprocating movement between the unillustrated under molding forming position and corner molding forming position and the side molding forming position as shown in FIG. 56.

Furthermore, said third die 853 enters an extrusion molding gate compartmented with said first die 852 and second die 851 from the interior side of the extruding direction to divide said extrusion molding gate so as to compartment different form extrusion molding gates, and accordingly in the tip section of this third die 853, an extrusion molding gate 853a having a contour form corresponding to a surface form of the installation section 751 of the side molding 75B is created, and this extrusion molding gate is constituted so as to be able to perform a reciprocating movement toward the molding extruding direction with a driving force from an unillustrated driving motor. This third die 853 is extruded toward this side in the front of the extruding direction when the first die 852 is put under the most separate opening condition against said second die 851.

Each process performed by using a molding metal mold of such an extruding metal mold device, such as a basic extruding process to mold the under molding 75A, a variation extruding process to mold the corner molding 75C, a divided extruding process to mold the side molding 75B and a cutting process to remove unnecessary extruded moldings is basically the same with those in said embodiments, and so an explanation will be omitted.

We claim:

1. An automobile windshield molding comprising a long size body installed consecutively from a first part corresponding to an edge of a windshield fixed to a vehicle body panel through a second part and to a third part, the automobile windshield molding comprising:

a decorative section for covering an outside portion of said vehicle body panel in a belt form;

an installation section embedded such as to project from a rear side of said decorative section to an inside portion of a vehicle body; and a metallic core material installed so as to constitute a supporting frame for said molding and reinforce said decorative section;

wherein:

said decorative section comprises an elongate continuous body, of which an outside surface of said vehicle body formed in a cross section in a direction at right angles to a lengthwise direction is approximately the same in the lengthwise direction;

said installation section is integral with said decorative section and has different cross-sectional shapes between the first part corresponding to the edge of said windshield and said second and third parts; and said metallic core material is disposed in said decorative section and said installation section so as to extend from said decorative section to said installation section, and said metallic core material is not arranged in said second part.

2. An automobile windshield molding according to claim 1, wherein said metallic core material is arranged in only said first part corresponding to the edge of the windshield.

3. An automobile windshield molding according to claim 1, wherein said third part includes an upper edge of the windshield.

4. An automobile windshield molding according to claim 1, wherein said metallic core material is formed into an approximately L cross-sectional shape from said decorative section to said installation section.

5. An automobile windshield molding according to claim 1, wherein said first part corresponds to a side edge of the windshield, and said second part corresponds to a corner edge of the windshield.

6. An automobile windshield molding comprising:

a decorative section which covers an outside surface of a vehicle body panel;

an installation section embedded to an inside portion of a vehicle body such as to project from a rear side of said decorative section;

a metallic core material installed so as to constitute a supporting frame for said molding; and a rainwater drain channel compartmented in part through the entire molding to provide for a space between said decorative section and an outside surface of a windshield fixed to said vehicle body panel, said metallic core material reinforcing said decorative section and said rainwater drain channel;

wherein:

said molding extends consecutively from a first part corresponding to a regular width section of the rainwater drain channel in which said decorative section is set to be opposed at regular intervals toward said windshield through a second part corresponding to various width sections of the rainwater drain channel in which said decorative section is set to be opposed at various intervals toward the windshield to a third part corresponding to a part having no rainwater drain channel;

said decorative section comprises an elongate continuous body, of which an outside surface of the vehicle body formed in a cross section in a direction at right angles to a lengthwise direction is approximately the same in the lengthwise direction;

said installation section has different cross-sectional shapes between said first part corresponding to said regular width section of the rainwater drain channel and the third part; and said metallic core material is embedded in said decorative section and said installation section so as to extend from said decorative section to said installation section, and said metallic core material is not arranged in said second part corresponding to various width sections of the rainwater drain channel.

7. An automobile windshield molding according to claim 6, wherein said metallic core material is arranged in only said first part corresponding to the regular width section of the rainwater drain channel.

8. An automobile windshield molding according to claim 6, wherein said first part corresponding to the regular width section of the rainwater drain channel corresponds to a side edge of the windshield and said third part corresponds to an upper edge of the windshield.

9. An automobile windshield molding according to claim 6, wherein said metallic core material is formed into an approximately L cross-sectional shape from said decorative section to said installation section.

* * * * *